US008832641B2

(12) United States Patent
Schneider

(10) Patent No.: US 8,832,641 B2
(45) Date of Patent: Sep. 9, 2014

(54) MODEL-OPERATIVE PATTERN REPRESENTATION AND OPERATIONAL ENABLEMENT USING DECLARATIVE COMPONENTIAL-DRIVEN DOMAIN-SPECIFIC PROGRAMMING LANGUAGE

(75) Inventor: Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 1118 days.

(21) Appl. No.: 12/205,692

(22) Filed: Sep. 5, 2008

(65) Prior Publication Data

US 2010/0061641 A1  Mar. 11, 2010

(51) Int. Cl.
*G06F 9/44* (2006.01)

(52) U.S. Cl.
USPC ........................................................ 717/104

(58) Field of Classification Search
USPC ........................................................ 717/104
See application file for complete search history.

(56) References Cited

U.S. PATENT DOCUMENTS

| | | | |
|---|---|---|---|
| 6,324,541 B1 | 11/2001 | de l'Etraz et al. |
| 6,519,571 B1 | 2/2003 | Guheen et al. |
| 7,627,861 B2 | 12/2009 | Smith et al. |
| 8,056,048 B2 | 11/2011 | Stevenson et al. |
| 8,522,198 B2 | 8/2013 | Schneider et al. |
| 8,661,405 B2 | 2/2014 | Stevenson et al. |
| 2003/0158701 A1 * | 8/2003 | Yasuda et al. ................ 702/179 |
| 2003/0204503 A1 | 10/2003 | Hammer et al. |
| 2004/0148592 A1 * | 7/2004 | Vion-Dury .................... 717/152 |
| 2005/0166193 A1 | 7/2005 | Smith et al. |
| 2007/0011652 A1 | 1/2007 | Schneider |
| 2007/0043992 A1 | 2/2007 | Stevenson et al. |
| 2007/0136264 A1 | 6/2007 | Tran |
| 2008/0127346 A1 * | 5/2008 | Oh et al. .......................... 726/23 |
| 2011/0007971 A1 | 1/2011 | Karkkainen |
| 2011/0107296 A1 | 5/2011 | Schneider et al. |
| 2012/0023477 A1 | 1/2012 | Stevenson et al. |

OTHER PUBLICATIONS

Franklin, Steven; Customizing and Automating Rational XDE Developer—Java Platform Edition; Feb. 2004.*
Johnson, Ralph; Frameworks = (Components + Patterns); Oct. 1997; Communications of the ACM; vol. 40; p. 39-42.*
Schneider, Scott E. and Lexvold, Randy, "Ephiphanies of patterns! A hands-on survey of pattern-related automation technologies", IBM Corporation, presented at EclipseCon 2008, Mar. 17-20, 2008, Santa Clara, CA, pp. 1-35.
Scott E. Schneider et al., U.S. Appl. No. 12/613,492, filed Nov. 5, 2009, Office Action, Nov. 7, 2012, 10 pages.

* cited by examiner

*Primary Examiner* — Li B Zhen
*Assistant Examiner* — Bradford Wheaton
(74) *Attorney, Agent, or Firm* — Marcia L. Doubet

(57) ABSTRACT

Pattern representation and enablement of operations pertaining thereto are disclosed, with model-operative pattern representation using a declarative componential-driven domain-specific programming language. Accordingly, pattern codifications are decoupled from code for execution of specific operational use cases against the patterns, occurrences, and models of interest. Variability points are codified in patterns, enabling a particular pattern to be used with multiple operations, multiple models, and so forth.

20 Claims, 44 Drawing Sheets

FIG. 4

State Pattern Codification
400

*401* library design;

*410* ⎡ use object.concretization;
⎣ use object.delegation;
use design.singleton;

*420* pattern state composites delegation, concretization, singleton {
*421* *422* *423* *424*

*430* ⎧ structure {
*440* ⎡ roles:
*441* context?, state, concrete-state+;
*442* *443*
*450* relations:
delegates-to(context, state),
abstracts(concrete-state+, state);
}

*460* ⎧ behavior {
constraints:
*470* ⎡ delegates(context, state); *471*
⎣ concretizes(concrete-state, state);
concrete-state = singleton?;
}
}

State Composition

700

FIG. 8
Barbell Pattern Codification
*800*

*801* library example;

*810* {
use uml.class;
use uml.association;
use lang.inequality;
}

*820* pattern barbell composites class, association, inequality { *821* *822* *823* *824*

*830* {
structure {
*840* roles:
left-bell, right-bell;
*850* relations:
bar(left-bell, right-bell);
}

*860* behavior {
constraints:
*870* { left-bell, right-bell = class; *871*
not-equals(left-bell, right-bell); *872*
associates(left-bell, right-bell); *873*
}
}
}

Barbell Pattern Composition

FIG. 10
Class Pattern
1000

```
library uml;
       1021
1020 native pattern class {
       structure {
       1040 roles: x;
       1050 properties: x = class;
       }
       behavior {
       operations:     1073
       1070  when * invoke java:com.ibm.prose.content.uml.Class$;
                 1071  1072              1074
       }
}
```

1030 (brace for structure block)
1060 (brace for behavior block)

FIG. 11
Class Pattern (Java behavior)
1100

```java
package com.ibm.prose.content.uml;

import com.ibm.prose.common.Boolean;
import com.ibm.prose.model.Occurrence;
import com.ibm.prose.model.utils.ModelUtil;
import com.ibm.prose.operations.detect.Detectable;

/**
 * Native pattern operation implementations for the class micro-pattern
 *
 * @author Scott E. Schneider (exo9000)
 */
public class Class
    implements Detectable {

/*
     * (non-Javadoc)
     *
     * @see com.ibm.prose.operations.detect.Detectable#detect(Occurrence)
     */
    public Boolean detect(final Occurrence candidate) {
        return Boolean
            .valueOf(ModelUtil.getValue(candidate).getObject() instanceof org.eclipse.uml2.uml.Class);
    }
}
```

FIG. 12

Association Pattern

*1200*

```
library uml;

1220 native pattern association {
        structure {
1240      roles: x, y;
1250      relations: associates(x, y);
        }
        behavior {
1270      operations:
              when * invoke java:com.ibm.prose.content.uml.Association$;
        }
}
```

1230 → (structure block)
1260 → (behavior block)
1271, 1272, 1273, 1274 (labels on behavior line)

FIG. 13
Association Pattern (Java behavior)
1300

```java
package com.ibm.prose.content.uml;

import org.eclipse.emf.common.util.EList;
import org.eclipse.uml2.uml.NamedElement;
import org.eclipse.uml2.uml.Property;
import org.eclipse.uml2.uml.Type;

import com.ibm.prose.common.Boolean;
import com.ibm.prose.model.Occurrence;
import com.ibm.prose.model.utils.ModelUtil;
import com.ibm.prose.operations.detect.Detectable;

/**
 * Native pattern operation implementations for the association micro-pattern
 *
 * @author Scott E. Schneider (exo9000)
 */
public class Association
    implements Detectable {

/*
     * (non-Javadoc)
     *
     * @see com.ibm.prose.operations.detect.Detectable#detect(Occurrence)
     */
```

FIG. 13 (cont'd)

```
public Boolean detect(final Occurrence candidate) {
    final Object first = ModelUtil.getValue(candidate,"x").getObject();
    final Object second = ModelUtil.getValue(candidate,"y").getObject();
    if (first instanceof Type && second instanceof Type) {
        final Type x = (Type) first;
        final Type y = (Type) second;
        final EList<org.eclipse.uml2.uml.Association> associations = x.getAssociations();
        for (final org.eclipse.uml2.uml.Association association :associations) {
            int duplicates = 0;
            for (final NamedElement named : association.getMembers()) {
                if (named instanceof Property) {
                    final Property property = (Property) named;
                    if (x == y && x.equals(property.getType())) {
                        if (duplicates > 0) {
                            return Boolean.TRUE;
                        }
                        duplicates++;
                    } else {
                        if (property.getType().equals(y)) {
                            return Boolean.TRUE;
                        }
                    }
                }
            }
        }
    }
    return Boolean.FALSE;
}
```

FIG. 14
Inequality Pattern
1400

```
library lang;

1420 native pattern inequality {
     structure {
1430     1440 roles: x, y;
         1450 relations: not-equals(x, y);
     }
     behavior {
1460 1470 operations:                              1473
              when * invoke java:com.ibm.prose.content.lang.Inequality$;
              1471   1472                                          1474
     }
}
```

FIG. 15
Inequality Pattern (Java behavior)

*1500*

```java
package com.ibm.prose.content.lang;

import com.ibm.prose.common.Boolean;
import com.ibm.prose.model.Occurrence;
import com.ibm.prose.model.utils.ModelUtil;
import com.ibm.prose.operations.detect.Detectable;

/**
 * Native pattern operation implementations for the equality micro-pattern
 *
 * @author Scott E. Schneider (exo9000)
 */
public class Inequality
    implements Detectable {

/*
     * (non-Javadoc)
     *
     * @see com.ibm.prose.operations.detect.Detectable#detect(Occurrence)
     */
    public Boolean detect(final Occurrence candidate) {
        final Object first = ModelUtil.getValue(candidate, "x").getObject();
        final Object second = ModelUtil.getValue(candidate, "y").getObject();
        return Boolean.valueOf(!first.equals(second));
    }
}
```

```
/**
 * This sample creates two patterns, one string pattern and one pair pattern
 * that composites the string pattern, all in the same library.
 */
public final void testConstructAndSave() {

// Initialize prose model package
    ModelPackageImpl.init();

// Create library, pair pattern, roles and relation
    final Extent extent = ModelFactory.eINSTANCE.createExtent();
    final Library testLibrary = ModelFactory.eINSTANCE.createLibrary();
    extent.getLibrary().add(testLibrary);
    this.setName(testLibrary, "test");
    final Pattern pairPattern = ModelFactory.eINSTANCE.createPattern();
    this.setName(pairPattern, "pair");
    testLibrary.getPattern().add(pairPattern);
    final Role leftRole = ModelFactory.eINSTANCE.createRole();
    this.setName(leftRole, "left");
    final Role rightRole = ModelFactory.eINSTANCE.createRole();
    this.setName(rightRole, "right");
    pairPattern.getStructure().add(leftRole);
    pairPattern.getStructure().add(rightRole);
    final Relation pairsRelation = ModelFactory.eINSTANCE.createRelation();
    this.setName(pairsRelation, "pairs");

// Create predicate left role
    final EList<PredicateRole> pairedRoles = pairsRelation.getPredicateRole();
    final PredicateRole predicateLeftRole = ModelFactory.eINSTANCE.createPredicateRole();
    predicateLeftRole.setPredicate(pairsRelation);
    pairsRelation.getPredicateRole().add(predicateLeftRole);
    predicateLeftRole.setRole(leftRole);
    pairedRoles.add(predicateLeftRole);
```

FIG. 18A (cont'd)

```
// Create predicate right role
final PredicateRole predicateRightRole = ModelFactory.eINSTANCE.createPredicateRole();
predicateRightRole.setPredicate(pairsRelation);
pairsRelation.getPredicateRole().add(predicateRightRole);
predicateRightRole.setRole(rightRole);
pairedRoles.add(predicateRightRole);
pairPattern.getStructure().add(pairsRelation);

// Create string pattern in same library with property string
final Pattern stringPattern = ModelFactory.eINSTANCE.createPattern();
this.setName(stringPattern, "string");
testLibrary.getPattern().add(stringPattern);
final Role stringRole = ModelFactory.eINSTANCE.createRole();
this.setName(stringRole, "string");
stringPattern.getStructure().add(stringRole);
final Property stringProperty = ModelFactory.eINSTANCE.createProperty();
this.setName(stringProperty, "string");
final EList<PredicateRole> stringRoles = stringProperty.getPredicateRole();
final PredicateRole predicateStringRole = ModelFactory.eINSTANCE.createPredicateRole();
predicateStringRole.setPredicate(stringProperty);
predicateStringRole.setRole(stringRole);
stringRoles.add(predicateStringRole);
stringPattern.getStructure().add(stringProperty);

// Create simple console output operation for string pattern
final Fragment codeFragment = ModelFactory.eINSTANCE.createFragment();
stringPattern.getBehavior().add(codeFragment);
codeFragment.setCode("System.out.println($string);");
final Operation operation = ModelFactory.eINSTANCE.createOperation();
codeFragment.setOperation(operation);
```

FIG. 18A (cont'd)

```
// Create first string composition constraint
final Composition leftConstraint = ModelFactory.eINSTANCE.createComposition();
pairPattern.getBehavior().add(leftConstraint);
final EList<Variable> leftVariables = leftConstraint.getVariable();
final Variable leftVariable = ModelFactory.eINSTANCE.createVariable();
leftVariables.add(leftVariable);
final Occurrence leftOccurrence = ModelFactory.eINSTANCE.createOccurrence();
leftOccurrence.setPattern(stringPattern);
leftOccurrence.getParticipant().add(leftVariable);
leftVariable.setPredicateRole(predicateStringRole);
leftVariable.setSubstitute(predicateLeftRole);

// Create second string composition constraint
final Composition rightConstraint = ModelFactory.eINSTANCE.createComposition();
pairPattern.getBehavior().add(rightConstraint);
final EList<Variable> rightVariables = rightConstraint.getVariable();
final Variable rightVariable = ModelFactory.eINSTANCE.createVariable();
rightVariables.add(rightVariable);
final Occurrence rightOccurrence = ModelFactory.eINSTANCE.createOccurrence();
rightOccurrence.setPattern(stringPattern);
rightOccurrence.getParticipant().add(rightVariable);
rightVariable.setPredicateRole(predicateStringRole);
rightVariable.setSubstitute(predicateRightRole);

// Save the model
Registry.INSTANCE.getExtensionToFactoryMap().put("extent", new XMIResourceFactoryImpl());
final Resource resource = new XMIResourceFactoryImpl().createResource(URI.createFileURI("models/test.extent"));
resource.getContents().add(extent);
try {
    resource.save(Collections.emptyMap());
} catch (final IOException e) {
    e.printStackTrace();
}
}
```

FIG. 18B

_1850_ library test

_1855_
```
pattern pair composites string {
    structure {
        roles: left, right;
        relations: pairs(left, right);
    }
    behavior {
        constraints: left, right = string;
    }
}
```

_1860_
```
local pattern string {
    structure {
        roles: string;
        properties: string = string;
    }
    behavior {                              1865
        operations:
            when * invoke java:fragment {
                System.out.println($string); 1870
            }
    }
}
```

FIG. 26

```java
package com.ibm.prose.execution.strategies.execution;

import java.util.List;

import com.ibm.prose.common.Pair;
import com.ibm.prose.execution.strategies.comprehension.ComprehensionStrategy;
import com.ibm.prose.execution.strategies.minimization.DomainMinimizationStrategy;
import com.ibm.prose.execution.strategies.navigation.DomainNavigationStrategy;
import com.ibm.prose.execution.strategies.selection.ExtentSelectionStrategy;
import com.ibm.prose.invocation.external.Invocable;
import com.ibm.prose.model.Occurrence;
import com.ibm.prose.model.Pattern;
import com.ibm.prose.model.common.Domain;
import com.ibm.prose.model.utils.ModelUtil;
import com.ibm.prose.operations.common.Operation;

class PatternFocusedStrategy<E, R>
    extends ExecutionStrategy<R> { private final List<E> elements;

private final ExtentSelectionStrategy selectionStrategy;

private final DomainMinimizationStrategy<E> minimizationStrategy;

private final DomainNavigationStrategy<E> navigationStrategy;

private final ComprehensionStrategy<E> comprehensionStrategy;
```

FIG. 26 (cont'd)

```
PatternFocusedStrategy(final Operation<R> operation,
    final List<E> elements,
    final ExtentSelectionStrategy selectionStrategy,
    final DomainMinimizationStrategy<E> minimizationStrategy,
    final DomainNavigationStrategy<E> navigationStrategy,
    final ComprehensionStrategy<E> comprehensionStrategy) {
  super(operation);
  this.elements = elements;
  this.selectionStrategy = selectionStrategy;
  this.minimizationStrategy = minimizationStrategy;
  this.navigationStrategy = navigationStrategy;
  this.comprehensionStrategy = comprehensionStrategy;
}

/*
 * (non-Javadoc)
 *
 * @see com.ibm.prose.execution.strategies.execution.ExecutionStrategy#execute()
 */
@Override
public R execute() {

// Initialize cumulative results
  final R results = this.operation.createResult();

// Iterate patterns using chosen extent selection strategy
  for (final Pattern pattern : this.selectionStrategy) {

System.out.println("Selected pattern is '" +
        ModelUtil.getName(pattern.getLibrary()) + "." +
        ModelUtil.getName(pattern) + "'");

// Attempt to minimize domain and thus search space
    final Domain<E> minimized = this.minimizationStrategy.minimize(
        pattern, new Domain<E>(pattern, this.elements));
```

FIG. 26 (cont'd)

```
System.out.println("Domain for pattern '" +
    ModelUtil.getName(pattern.getLibrary()) + "'.:" +
    ModelUtil.getName(pattern) + "' minimized from [" +
    this.elements.size() + "] elements to " +
    minimized.getDimensions() + " elements");

System.out.println("Comprehension start for '" +
    ModelUtil.getName(pattern.getLibrary()) + "'.:'" +
    ModelUtil.getName(pattern) + "' ....");

// Iterate domain and comprehend pattern for the operation
for (final List<E> choices : this.navigationStrategy
    .createNavigator(pattern, minimized)) {

// Comprehend pattern with the given element choices
    final Pair<Occurrence, List<Pair<Invocable, Occurrence>>> result = this.comprehensionStrategy
        .comprehend(pattern, choices);

// Invoke the operation given the compound and invocables
    this.operation.consider(results, this.operation.invoke(
        result.first, result.second));

} // Navigate to next choice of elements

System.out.println("Comprehension stop for '" +
    ModelUtil.getName(pattern.getLibrary()) + "'.:'" +
    ModelUtil.getName(pattern) + "' ....");

} // Select next pattern

// Return cumulative results
return results;

```
grammar Prose;

options { language=Java; output=AST; } tokens {
    /*     Specification Keywords
        -- Pattern is contained within a library
        -- Patterns and modules can contain multiple patterns
        -- Roles, relations and properties define the structure
behavior              -- Structure and behavior define a pattern
    */                -- Constraints and operations define the
    LIBRARY = 'library';
    PATTERN = 'pattern';
    STRUCTURE = 'structure';
    BEHAVIOR = 'behavior';
    ROLES = 'roles';
    RELATIONS = 'relations';
    PROPERTIES = 'properties';
    CONSTRAINTS = 'constraints';
    OPERATIONS = 'operations';
    USE = 'use';

/*     Pattern Modifiers
        -- Abstract patterns cannot be instantiated directly
        -- Local patterns expose pattern-private access
    */
    ABSTRACT = 'abstract';
    COLLEAGUE = 'colleague';          -- Colleague patterns expose library-private access
    LOCAL = 'local';

/* Native Operation Related */
    NATIVE = 'native';
    WHEN = 'when';
    INVOKE = 'invoke';

/*     Pattern Inclusion Keywords
        -- Approaches to reuse at the static pattern-level
    */
    COMPOSITES = 'composites';        -- Progressively increasing strength
    IMPLEMENTS = 'implements';
    EXTENDS = 'extends';
```

FIG. 27 (cont'd)

```
REFINES = 'refines';
SUPPLANTS = 'supplants';

/* Symbol Tokens */
STRIKE = '#';
COMPLEMENT = '!';
ZERO = '0';
ONE = '1';
UNLIMITED = '-1';
WILDCARD = '*';

/*    Reserved For Future Use
      -- Connections might be pattern static pattern occurrences (for instance pattern participants are patterns, this
         might be used to declarate classification types of relationships between patterns in an extendable manner)
*/
CONNECTION = 'connections';

/* Imaginary Tokens/Nodes for AST Construction */
STRUCTURE;
BEHAVIOR;
MODULE;
CONSTRAINT;
MODIFIERS;
OPTIONALITY;
PROPERTY;
RELATION;
ROLE;
}

@header { package com.ibm.prose.parser.generated.declarative; } @lexer::header { package
com.ibm.prose.parser.generated.declarative; }
module
    :    libraryDeclaration? useDeclaration* patternDeclaration+ EOF          -> ^(MODULE libraryDeclaration?
^(USE useDeclaration)* ^(PATTERN patternDeclaration)+)    ;

useDeclaration
    :    ...    'use' qualifiedName ';'  -> qualifiedName
```

FIG. 27 (cont'd)

```
patternDeclaration
    :    (patternModifiers 'pattern' name patternInclusions patternBody)    ->    name ^(MODIFIERS
         patternModifiers) patternInclusions patternBody patternModifiers
    :    ('abstract'|'native'|'colleague'|'local')* patternInclusions
    :    compositesInclusions? extendsInclusions? refinesInclusions? implementsInclusions?

compositesInclusions
    :    'composites' composite+=qualifiedName (',' composite+=qualifiedName)*    ->    ^(COMPOSITES
         $composite)* extendsInclusions
    :    'extends' extend+=qualifiedName (',' extend+=qualifiedName)*    ->    ^(EXTENDS $extend)* refinesInclusions
    :    'refines' refine+=qualifiedName (',' refine+=qualifiedName)*    ->    ^(REFINES $refine)* implementsInclusions
    :    'implements' implement+=qualifiedName (',' implement+=qualifiedName)*    ->    ^(IMPLEMENTS $implement)* libraryDeclaration
    :    'library' qualifiedName ';'
         ->    ^(LIBRARY qualifiedName)

patternBody
    :    '{' structureDeclaration? behaviorDeclaration? patternDeclaration* '}'
behaviorDeclaration? ^(PATTERN patternDeclaration)* structureDeclaration
    :    'structure' '{' structureBody '}'
         ->    ^(STRUCTURE structureBody)    ->    structureDeclaration?
```

FIG. 27 (cont'd)

```
behaviorDeclaration
    : 'behavior' '{' behaviorBody '}'
    -> ^(BEHAVIOR behaviorBody)
    ;

structureBody
    : rolesDeclaration? relationsDeclaration? propertiesDeclaration?
    ;

rolesDeclaration
    : 'roles'! ':'! roleDeclarationBody (';'! roleDeclarationBody)* ';'! ';'
    ;

relationsDeclaration
    : 'relations'! ':'! relationDeclarationBody (';'! relationDeclarationBody)* ';'! ';'
    ;

propertiesDeclaration
    : 'properties'! ':'! propertyDeclarationBody (';'! propertyDeclarationBody)* ';'! ';'
    ;

roleDeclarationBody
    : STRIKE? roleDeclaration
    -> ^(ROLE roleDeclaration STRIKE?)
    ;

propertyDeclarationBody
    : STRIKE? propertyDeclaration
    -> ^(PROPERTY propertyDeclaration STRIKE?)
    ;

relationDeclarationBody
    : STRIKE? relationDeclaration
    -> ^(RELATION relationDeclaration STRIKE?)
    ;

roleDeclaration
    : boundedName
    ...
    ;

propertyDeclaration
    : boundedName ('=' name)?
    ...
    ;
```

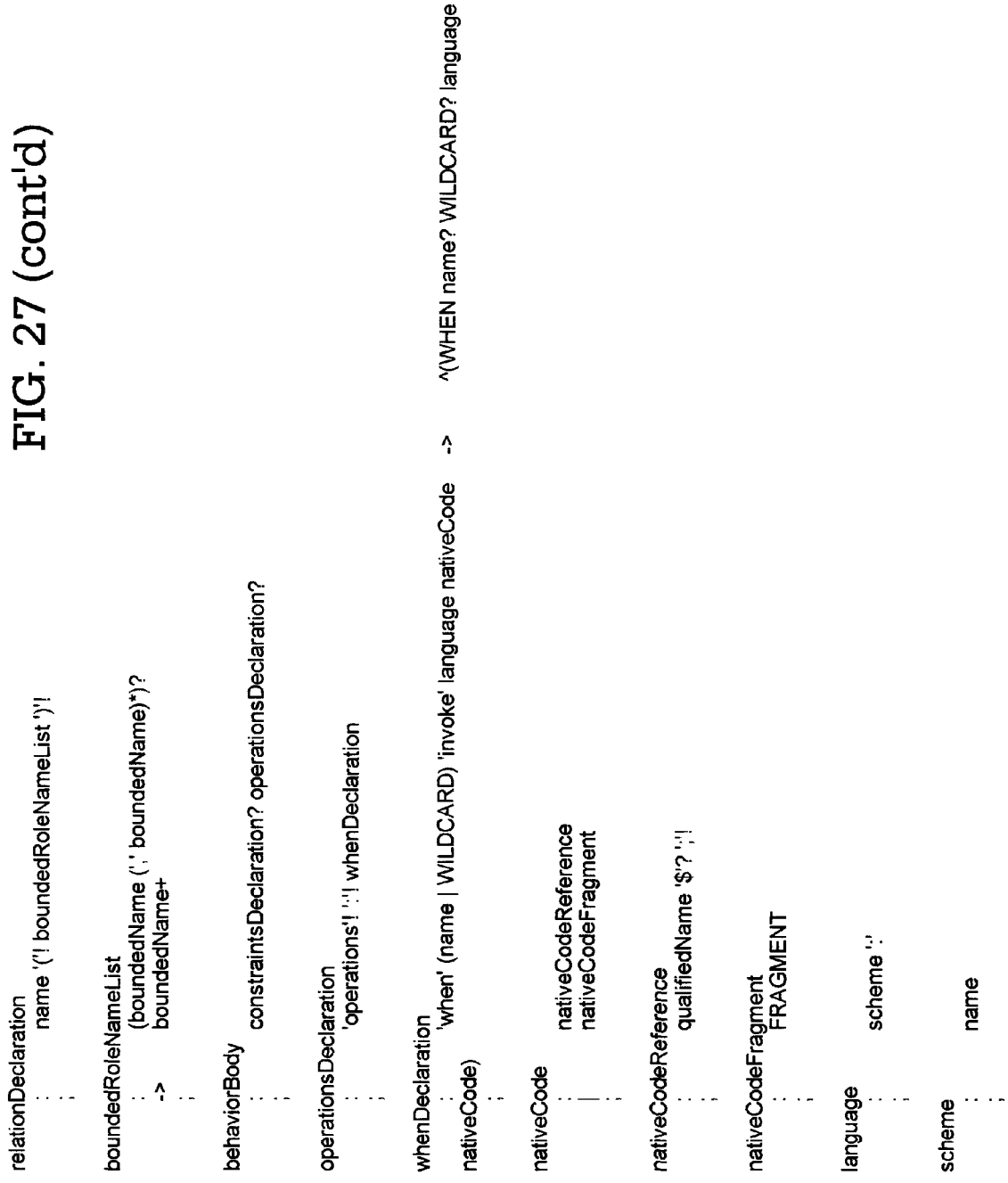

FIG. 27 (cont'd)

```
constraintsDeclaration
    : 'constraints' '{' '}' predicateUsage*
    ;

predicateUsage
    : (relationUsage
       propertyUsage) ';' ;'
    ;

relationUsage
    : predicateName '(' roleUseNameList ')' optionalityFactor?   -> ^(CONSTRAINT optionalityFactor?
    predicateName roleUseNameList)
    ;

propertyUsage
    : (predicateName '(' roleName ')'
       -> ^(CONSTRAINT predicateName roleName))
    | (roleName '=' predicateName
       -> ^(CONSTRAINT predicateName roleName))
    | (roleName '=' predicateName '(' predicateName)+      -> ^(CONSTRAINT predicateName roleName)+
       (',' roleName)+ '=' predicateName
       -> ^(CONSTRAINT predicateName roleName)+)
    ;

wildcard
    : '*'
    -> WILDCARD
    ;

roleName
    : name                                    -> ^(ROLE name)
    | (relation=name ':' role=name -> ^(ROLE $role $relation))        | (pattern=name ':' relation=name ':'
    |                              (wildcard -> ^(ROLE wildcard))        role=name -> ^(ROLE $role $relation $pattern))
    ;

name
    : Identifier
    ;

roleUseNameList
    : roleName (',' roleName)*
    ;
```

FIG. 27 (cont'd)

```
constraintsDeclaration
    ∷ 'constraints'! ':'! predicateUsage*
    ..

predicateName
    -> ('!' name optionalityFactor?
    |  COMPLEMENT optionalityFactor? name)
    -> (name optionalityFactor?
    |  optionalityFactor? name)

optionalityFactor
    -> ('?' ('<' '0' ':' DoubleDigit '>')
    |  ^(OPTIONALITY DoubleDigit))
    -> ('?'
    |  OPTIONALITY)

boundedName
    ∷ name boundary boundary
    ('?' -> ZERO ONE)
    ('*' -> ZERO UNLIMITED)
    ('+' -> ONE UNLIMITED)
    (('{' boundValue '}') -> boundValue boundValue       | (('{' lower=boundValue ';' upper=boundValue '}') ->
    (('{' boundValue ';' '}') -> boundValue UNLIMITED)   |                                   $lower $upper)
    boundValue)                                          |  (('{' ';' boundValue '}') -> ZERO
    -> ONE ONE boundValue       Digit+
    ..

qualifiedName
    ∷ Identifier ('.'! Identifier)*
    ..
```

FIG. 27 (cont'd)

```
qualifiedName
    :   Identifier (':' Identifier)*
    ;

DoubleDigit
    :   Digit Digit
    ;

Identifier
    :   Letter (Letter|Digit|'-')*
    ;

fragment
Letter
    :   'A'..'Z'|'a'..'z'
    ;

fragment
Digit
    :   '0'..'9'
    ;

WS  :   WS_Fragment {$channel=HIDDEN;}
    ;

COMMENT     :   '/*' ( options {greedy=false;} : . )* '*/' {$channel=HIDDEN;}
            ;

fragment
WS_Fragment
    :   (' '|'\r'|'\t'|'\u000C'|'\n')
    ;

FRAGMENT    :   'fragment'
                WS_Fragment*
                '{' ( options {greedy=false;} : . )* '}'
                WS_Fragment* ';'
            ;

LINE_COMMENT
    :   '//' ~('\n'|'\r')* '\r'? '\n' {$channel=HIDDEN;}
    ;
```

FIG. 27 (cont'd)

```
qualifiedName
    : Identifier ('.' Identifier)*
    ;

DoubleDigit
    : Digit Digit
    ;

Identifier
    : Letter (Letter|Digit|'-')*
    ;

fragment
Letter
    : 'A'..'Z'|'a'..'z'
    ;

fragment
Digit
    : '0'..'9'
    ;

WS : WS_Fragment {$channel=HIDDEN;}
    ;

COMMENT     '/*' ( options {greedy=false;} : . )* '*/' {$channel=HIDDEN;}    ;

fragment
WS_Fragment
    : (' '|'\r'|'\t'|'\u000C'|'\n')
    ;

FRAGMENT
    : 'fragment'
      WS_Fragment*
      '{' ( options {greedy=false;} : . )* '}'
      WS_Fragment* ';'
    ;

LINE_COMMENT
    : '//' ~('\n'|'\r')* '\r'? '\n' {$channel=HIDDEN;}    ;
```

MODEL-OPERATIVE PATTERN REPRESENTATION AND OPERATIONAL ENABLEMENT USING DECLARATIVE COMPONENTIAL-DRIVEN DOMAIN-SPECIFIC PROGRAMMING LANGUAGE

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

The present invention relates to computer programming, and deals more particularly with pattern representation and enablement of operations pertaining thereto.

In the general sense, a pattern is a recurring abstraction that specifies a configuration of objects and relationships among them. The relationships may be of various types, including sequential, spatial, temporal, logical, mathematical, and so forth. A pattern can be said to represent a common solution to a common problem in a given context.

In the context of software development, patterns are used extensively to solve small-scale as well as large-scale problems in the design, modelling, implementation, deployment, and/or maintenance of software systems. The application of a pattern to, or within, a software system causes the system to be structured, and to behave, in certain ways as dictated by or consistent with the pattern.

BRIEF SUMMARY OF THE INVENTION

The present invention is directed to model-operative pattern representation and operational enablement using declarative componential-driven domain-specific programming language. In one embodiment, this comprises: representing model-operative patterns by specifying, as a pattern codification for a particular pattern, structural features of the pattern and behavioral features of the pattern, wherein: the structural features identify at least one pattern role and at least one relationship involving the at least one pattern role; and the behavioral features identify how to use the structural features in constraining structural features of other composited patterns from which the particular pattern is composed or, when the particular pattern is not composed of other composited patterns, an operation to invoke for implementing the particular pattern.

The pattern codification may be stored in a pattern library that stores pattern codifications for a plurality of patterns, enabling the stored pattern codification for the particular pattern to be composited by a different pattern. The pattern codification may be used as a component for compositing a different pattern. The pattern codification may further specify a context applicable to the particular pattern. Preferably, each role and relationship in the particular pattern provides a point of variability for the particular pattern, and these variability points enable reuse of the particular pattern. This reuse of the particular pattern may occur when, for at least one of the at least one role of the particular pattern, the role is fulfilled by different participants.

The behavioral features preferably identify how to use the structural features in constraining structural features of other composited patterns from which the particular pattern is composed further comprises identifying, as constraints of the particular pattern, relationships from the other composited patterns and for each of those relations, roles of the particular pattern which are involved in those relationships from the other composited patterns.

The structural features may identify a plurality of pattern roles and at least one relationship involving at least two of the plurality of pattern roles. In this case, at least one of the plurality of pattern roles may be optional; at least one other one of the plurality of pattern roles may be mandatory; and/or at least one of the plurality of pattern roles may have a cardinality greater than one.

The at least one pattern role may be fulfilled by a participant in the particular pattern, and the participant may participate in the at least one relationship.

The particular pattern may be an atomic pattern when it is not composed of other composited patterns, and the operation to invoke when the particular pattern is an atomic pattern may be implemented using an object-oriented programming language or an imperative programming language.

Preferably, the pattern codification for the particular pattern is separate from code for execution of the particular pattern, and is independent of a model from which model elements are usable to fulfill each of the at least one roles.

The particular pattern may be comprehended in a particular model by identifying elements of the model as candidate participants for each of the at least one pattern roles of the particular pattern and a pattern operation may be executed using the comprehended pattern. The comprehending may further comprise recursively identifying elements of the model as candidate participants for each pattern role identified in the structural features of at least one other composited pattern from which the particular pattern is composed.

In another embodiment, the present invention comprises building patterns as composites by: representing a model-operative pattern as a specification of structural features of the pattern and behavioral features of the pattern; storing the specification for the model-operative pattern in a pattern library that stores pattern specifications for a plurality of model-operative patterns, enabling the stored pattern specification to be composited by a different model-operative pattern; and using the stored specification for the model-operative pattern as a component of a different pattern. In this embodiment, the structural features identify at least one pattern role and at least one relationship involving the at least one pattern role and the behavioral features identify how to use the structural features in constraining structural features of other composited patterns from which the pattern is composed or, when the pattern is not composed of other composited patterns, an operation to invoke for implementing the pattern. Using the stored specification may further comprise specifying at least one relationship identified in the structural features for the model-operative pattern in the specification of the behavioral features of the different pattern.

In yet another embodiment, the present invention provides operational enablement of patterns, comprising a storage medium and an interpreter. The storage medium stores a plurality of patterns, each of the patterns represented as a specification of structural features of the pattern and behavioral features of the pattern wherein, for each of the patterns: the structural features identify at least one pattern role and at least one relationship involving the at least one pattern role; and the behavioral features identify how to use the structural features in constraining structural features of other composited patterns from which the pattern is composed or, when the pattern is not composed of other composited patterns, an operation to invoke for implementing the pattern. The interpreter comprehends a selected one of the plurality of patterns in a particular model by identifying elements of the model as candidate participants for each of the at least one pattern roles of the selected pattern and executing a pattern operation using the comprehended pattern.

Embodiments of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 4 provides sample syntax that may be used to codify the sample pattern in FIG. 1, according to an embodiment of the present invention;

FIGS. 7 and 8 provide another sample pattern and sample syntax that may be used to codify this sample pattern according to an embodiment of the present invention, respectively;

FIGS. 10, 12, and 14 provide sample syntax that may be used to codify atomic patterns from which the sample pattern illustrated in FIGS. 7-8 is composed, according to an embodiment of the present invention;

FIGS. 11, 13, and 15 provide sample object-oriented programming language code that may be used to implement the atomic patterns in FIGS. 10, 12, and 14, respectively;

FIG. 18A illustrates an example of object-oriented code that programmatically constructs two patterns, manipulating a pattern at the meta-model level, and FIG. 18B shows a sample meta-model pattern representation for these same patterns using a declarative pattern specification language as disclosed herein;

FIG. 26 provides sample code that may be used for implementing an "execute" method corresponding to the processing in FIG. 19;

FIG. 27 provides a grammar for the Prose pattern representation language disclosed herein, by way of illustration but not of limitation;

DETAILED DESCRIPTION OF THE INVENTION

Figure 1:
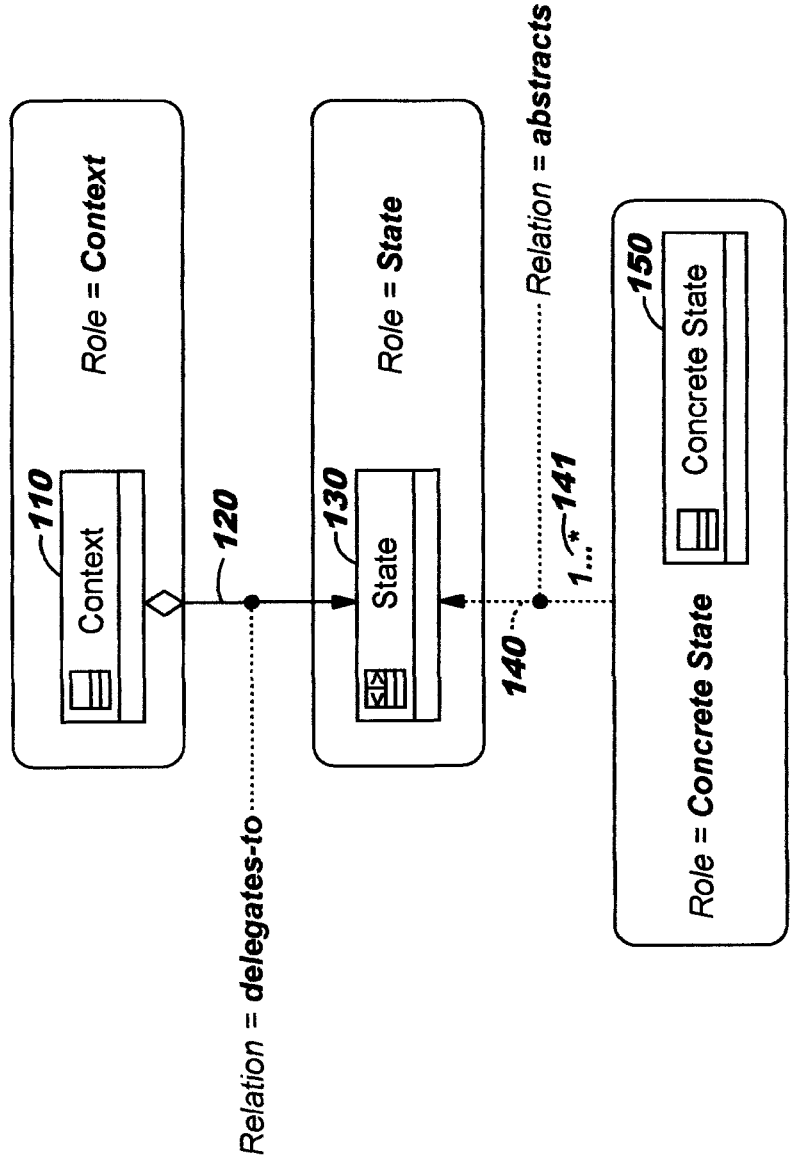
FIGS. 1 and 2 provide a sample pattern and corresponding sample pattern occurrence, respectively.

Many different things may exhibit patterns, including everyday items, models of various types, programming language code, and so forth, and thus in the general sense, patterns may be found anywhere. Java™ code, for example, may exhibit patterns. In a modeling environment, patterns may be exhibited in Unified Modeling Language ("UML") models, data models, and so forth. As abstractions, patterns offer desirable advantages. A common advantage is simplification. As another advantage, a pattern may be captured and a name may be associated therewith, and the pattern can then be reused.

Embodiments of the present invention are directed toward pattern representation and enablement of operations pertaining thereto, and in particular, an embodiment of the present invention is directed toward model-operative pattern representation using a declarative componential-driven domain-specific programming language. A model-operative pattern is a pattern that operates on models or elements in models. For example, an operation may correspond to applying an "observer" design pattern to a particular group of UML model elements, or to detecting a business process pattern in a business model, and so forth. Componential-driven refers to using patterns, as components, to compose other patterns.

A declarative, domain-specific language for pattern representation is disclosed. This language is referred to herein as "Prose", which is an acronym for "pattern reasoning and object-oriented specification environment", and may be considered as leveraging concepts from predicate calculus. This declarative language is based upon a premise that most patterns are defined in terms of other patterns. Stated another way, patterns are usable as components of other patterns. A pattern may therefore be considered a reusable software component, and a pattern library may be provided from which already-defined patterns can be selected when building new patterns.

While patterns offer advantages in a traditional software design cycle, patterns are also general enough to be relevant and valuable to other uses outside this arena. For purposes of the present invention, a pattern can be considered as a named, context-sensitive, constrained, composite, parameterized abstraction. These terms will now be described. When a pattern is named, the pattern can be referenced for purposes such as reuse. Context-sensitive means that the pattern may be defined with regard to a particular context or area of applicability. Constrained refers to defining a pattern through constraints on the entities (referred to equivalently herein as elements) that make up the pattern. Composite refers to specifying a pattern in terms of other patterns. Parameterized refers to declaring a pattern with regard to variability points, and as will be described in further detail below, these variability points enable a particular pattern to be adapted and applied in varying domains as parameter values are provided for the variability points. Accordingly, a pattern represented according to an embodiment of the present invention may be reused in different models. Abstraction refers to hiding implementation details while enabling a pattern to embrace domain-specific concepts.

A pattern occurrence, as that term is used herein, refers to an instance of a pattern. A pattern occurrence, or instance, therefore makes concrete (or "concretizes") what was abstract in the pattern itself. According to the present invention, constraints may be completely or partially satisfied in a pattern instance. When a pattern is instantiated, instances are preferably also created for the underlying patterns from which this particular pattern is composed, although in an alternative approach, the instantiation of at least some underlying patterns may be delayed (as will be discussed in more detail below). Concrete elements are specified in a pattern instance for at least some of the variability points in the pattern. And although the pattern instance includes concrete elements, the abstraction provided by the pattern itself may remain apparent in the instance. A pattern occurrence may therefore be considered as a concretization of the constrained, composite, parameterized abstraction.

Figure 2:
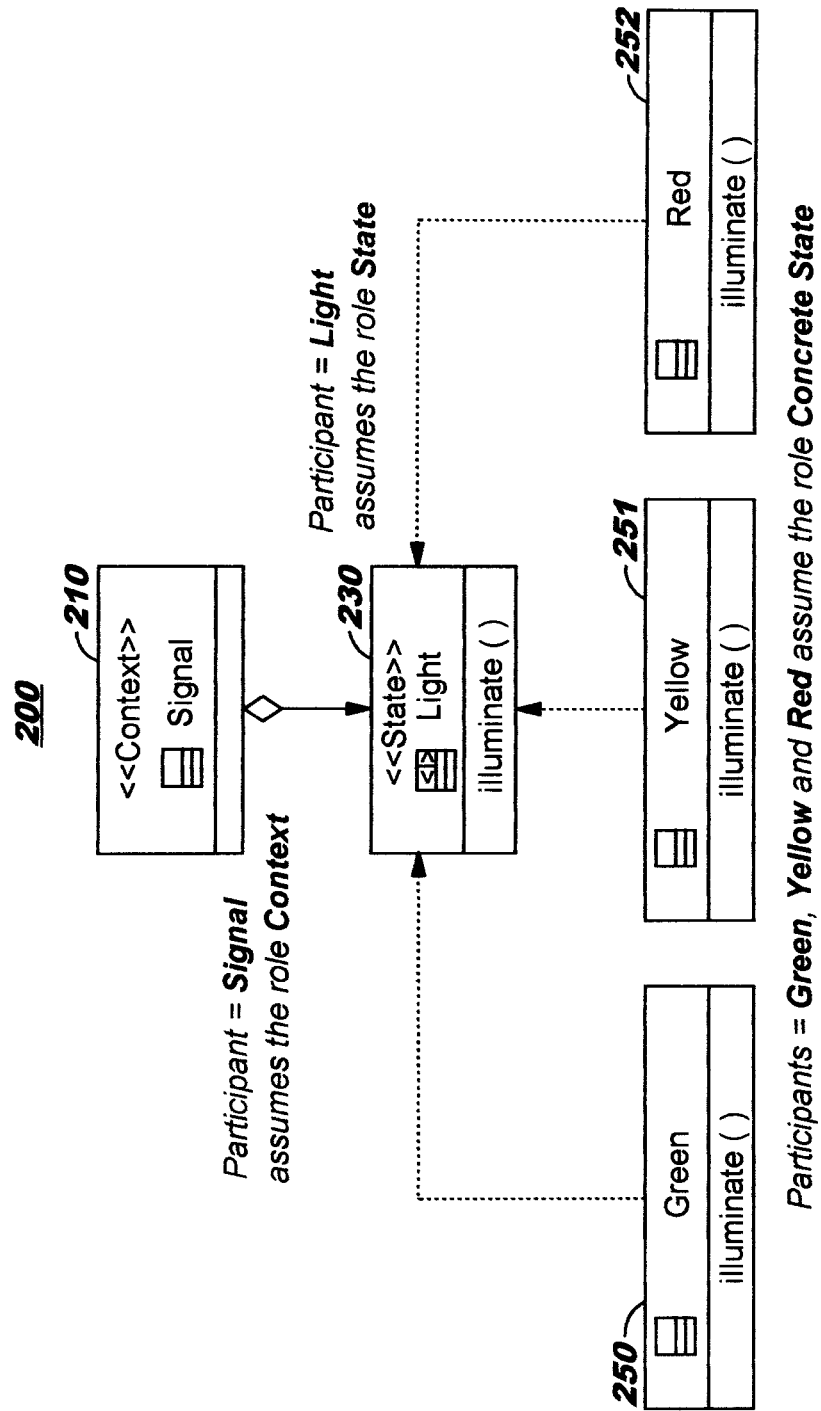

An example is provided in FIGS. 1 and 2 to illustrate the above-discussed concepts. FIG. 1 depicts a pattern referred to herein as the "state" pattern, and FIG. 2 illustrates one sample instance of this state pattern. The state pattern provides an abstraction of real-world entities that have an associated, and variable, state. By way of example, the instance shown in FIG. 2 illustrates a traffic signal and its potential states.

As shown in FIG. 1, the state pattern 100 of this example comprises three roles 110, 130, 150 and two relationships 120, 140. In the general case, the roles and relationships in a pattern provide points of variability for that pattern, and these variability points enable reuse of the pattern. Reuse of a pattern occurs when different participants fulfill, or assume, the roles of that pattern. So, for example, while FIG. 2 illustrates a sample instance where a role in the state pattern is fulfilled (i.e., assumed) by a traffic signal, that role might alternatively be assumed by another entity that has a state, such as a baking oven, thus reusing the state pattern.

FIG. 1 illustrates a first role 110 which indicates that the state pattern 100 operates in a context. A second role 130 indicates a state, which corresponds to the actual state being modeled and which is related to context 110 by a "delegates-to" relationship 120. A third role 150 indicates that the state pattern 100 has a concrete state. This concrete state 150 is related to state 130 by an "abstracts" relationship 140. A cardinality is shown as "1.*" for the abstracts relationship 140; see 141. In other words, state 130 is an abstract role that is related to one or more concrete states 150 by the abstracts relationship 140.

FIG. 2 provides an example occurrence 200 of the state pattern 100, showing how this state pattern 100 may be used to represent the states of a traffic signal. In the sample state pattern occurrence 200, which concretizes the state pattern for the traffic signal scenario, the participants that assume the various roles of the state pattern are as follows: a signal participant (see 210) assumes the context role 110 from FIG. 1; a light participant (see 230) assumes the state role 130; and three different states of the light of a traffic signal (see 250, 251, 252) assume the concrete state role 150. In this example, the participants assuming the concrete state role 150 are identified as "Green" 250, "Yellow" 251, and "Red" 252, thereby indicating that the state of the light for the traffic signal may be green, yellow, or red. Note that the "illuminate( )" syntax specified for each of "Green" 250, "Yellow" 251, and "Red" 252 in FIG. 2 is the name of the operation that all concrete state roles must implement according to the "concretization" pattern (not shown in FIG. 2) that defines the operation name and signature for the sample state pattern. When a particular state of "Green", "Yellow", or "Red" is plugged in and delegated to at run time, the behavior of what it means to be in a certain state for this certain operation will be executed.

Figure 3:
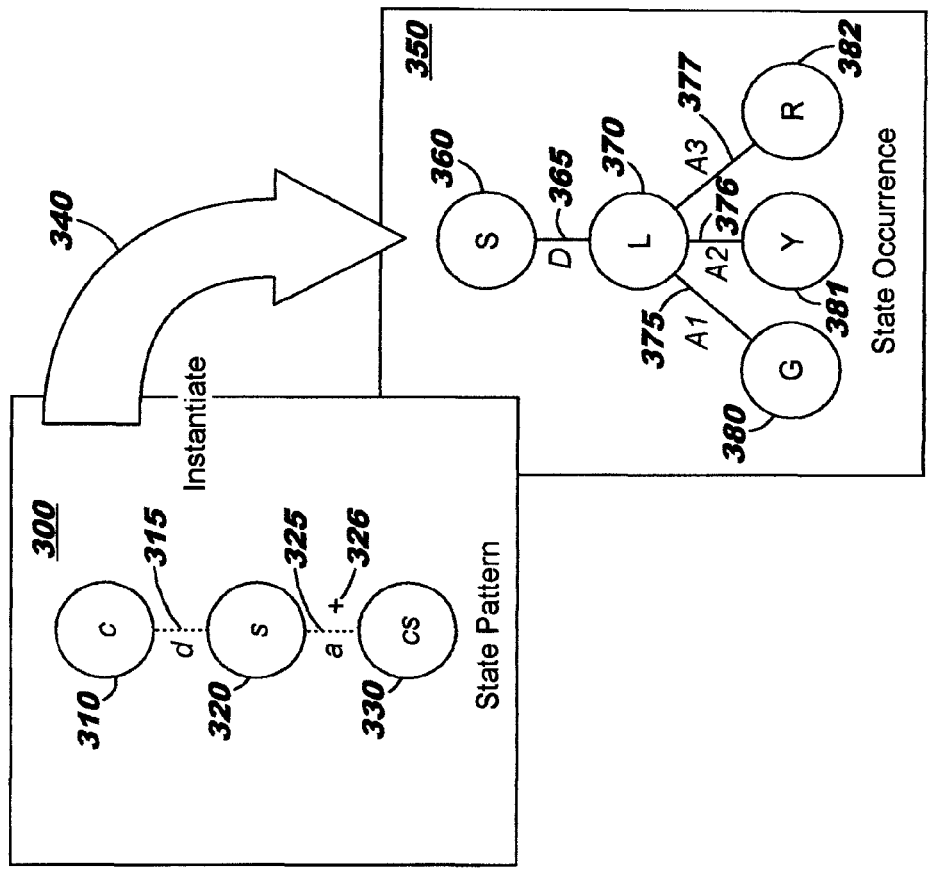
FIG. 3 provides an abstract graph, illustrating how the pattern and pattern occurrence from FIGS. 1 and 2 are related.

Conceptually, a pattern may be represented as an abstract graph where the vertices correspond to roles and the edges correspond to relationships. This is illustrated in FIG. 3 for the state pattern 100 and state occurrence 200, showing the pattern and the occurrence in graph form at 300 and 350, respectively. In graph 300, vertex 310 corresponds to the context role 110 of FIG. 1; vertex 320 corresponds to the state role 130; and vertex 330 corresponds to the concrete state role 150. Graph 300 also shows edge 315, which corresponds to the delegates relationship 120 of FIG. 1, and edge 325, which corresponds to the abstracts relationship 140. (Note also that the cardinality of the abstracts relationship 140 is indicated as 1-to-many by use of a "+" sign 326 in the sample graph 300.) The state pattern corresponding to graph 300 is instantiated as the state occurrence corresponding to graph 350, as indicated by arrow 340. In the graph 350 for the state occurrence, vertex 360 corresponds to the signal participant 210 of FIG. 2; vertex 370 corresponds to the light participant 230; and vertices 380, 381, 382 correspond to the green, yellow, and red participants 250, 251, 252. Edge 365 of graph 350 corresponds to the delegates relationship 120 of FIG. 1, and edges 375, 376, 377 correspond to the abstracts relationship 140.

According to an embodiment of the present invention, a pattern in the general case is represented as having three parts. The parts are a context (which may be optional in an alternative embodiment), a structure, and behavior. Each of these parts will now be discussed briefly for the general case, and an example showing how the state pattern may be codified using these parts will then be described with reference to FIG. 4.

The context indicates where and when a pattern is applicable. An alternative embodiment may omit the context, or provide for context to be optional, although inclusion of this part is believed to enable an implementation to operate in a more optimal manner (e.g., by narrowing the range of applicability of a pattern). As shown by way of example in FIG. 2, the state pattern 100 is applicable in the traffic signal context 210. However, as will be obvious to the reader, many different entities may be determined to exhibit a state property, in many different contexts. As one example of these other entities, a baking oven may assume the context role 110, and the state role 130 might then be assumed by a heating element, a timer, an oven light, and so forth. The concrete role 150 may then be assumed, for example, by participants identified as "On" and "Off".

The structure is the abstract syntax of a pattern, and may alternatively be referred to as the pattern signature. The structural features for a pattern define pattern roles and relations involving those roles. Referring again to the state pattern example as depicted in FIG. 1, the pattern signature in this example comprises three roles and two relationships.

The behavior is the pattern semantics, and thus specifies what it means for an entity to exhibit the pattern. The behavioral features use the structural features (e.g., the roles and relations) of the pattern for constraining expressions that are defined using structural features from another pattern or patterns.

In an embodiment of the present invention, the specification of a pattern is provided in a declarative and consistent manner, using a human-readable and machine-processable document that details the defining characteristics of that pattern (as will be discussed with reference to the examples in FIGS. 4 and 8), and the code for execution of specific operational use cases against these patterns, occurrences, and models of interest (e.g., for pattern application, pattern detection, and so forth) is separate from the pattern specification. A benefit of this decoupling approach is that new patterns can be created while leveraging the current operations supported on standard pattern specifications. In addition, new operations can be added and honed, and can then be reused by other existing patterns in the system.

Referring now to FIG. 4, a sample codification 400 of the state pattern is illustrated. (It should be noted that the syntax shown in the example codifications is illustrative but not limiting.) A "library" statement 401 specifies where this pattern codification will be stored (and may be considered as being similar to a package declaration in the Java™ programming language). One or more "use" statements 410 specify where to find other patterns used by this pattern. (These other patterns are discussed in more detail with reference to FIG. 5, below). A "pattern" statement 420 provides a declaration of the pattern, and a name 421 for the pattern is specified therein along with a "composites" attribute that identifies other patterns 422-424 which are used by this pattern. In the general case, the "composites" attribute may name one or more other patterns. (Note that the "use" statements 410 provide information on where to find the Delegation 422, Concretization 423, and Singleton 424 patterns; if a particular pattern is stored in the same library as this State pattern, then the "use" statement is not strictly required at 410 for that pattern.)

A "structure" definition 430 provides the pattern signature and defines the roles and relationships for the pattern, as mentioned earlier. For this example 400, the structure comprises three roles 440 and two relationships 450. These roles 440 and relationships 450 are as described above with reference to FIGS. 1-3. In the illustrated syntax, a "?" follows the "context" role name (see 441), thereby indicating that this role is optional, and a "+" follows the "concrete-state" name (see 443), thereby indicating that one or more participants for this role may exist in an occurrence of this particular pattern 400; by default, absence of one of these characters after a role name (see 442) indicates that the role will be assumed by a single participant in an occurrence of the pattern. Each of the relationships 120, 140 in the state pattern example is between participants in two different ones of the pattern's roles, and thus each relationship definition specified at 450 includes two parameters within a parameter list that is enclosed in parentheses and in which the parameters are separated by commas (by way of illustration but not of limitation), and each of these parameters corresponds to one of the role names defined at 440.

A "behavior" definition 460 specifies constraints on occurrences of pattern 400. That is, the syntax specified at 470 must be in effect (i.e., must be true) for this pattern to be applied. For example, the "delegates" constraint at 471 indicates that the participant proposed for assuming the context role (see 110 of FIG. 1) must have a delegates-to relationship (see 120) to the participant proposed for assuming the state role (see 130) in order for the state pattern to be applied using these participants.

Note that the sample state pattern codification 400 omits the optional context part. (Similarly, the sample barbell codification 800 provided in FIG. 8, which is discussed below, also omits the context part.)

Figure 5:
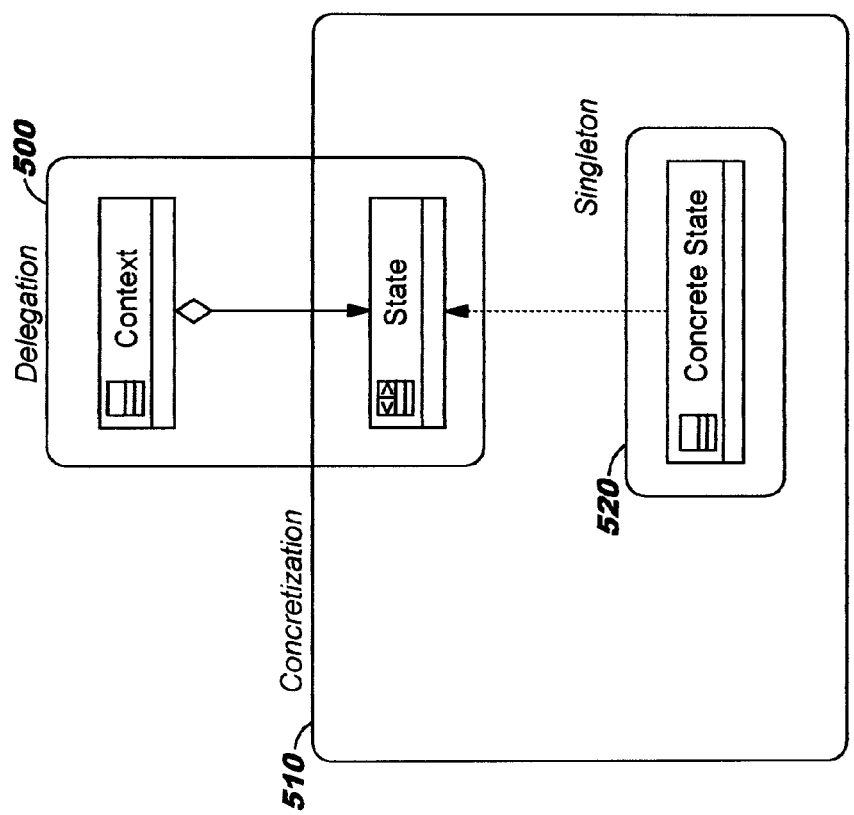
FIG. 5 illustrates a sample pattern composition, with regard to the sample pattern from FIG. 1, showing how one pattern may be composed of other patterns.

As noted earlier, patterns may be composites which are composed from other patterns. This is illustrated in FIG. 5 with reference to the sample state pattern. As shown in FIG. 5, the three-role and two-relationship state pattern may be decomposed into (or conversely, may be composed from) a delegation pattern 500, a concretization pattern 510, and a singleton pattern 520. The delegation pattern 500, for example, comprises two roles and a relationship therebetween, where the relationship corresponds to a particular one of the roles delegating to the other. The concretization pattern 510 also comprises two roles and a relationship, and the relationship corresponds to a particular one of the roles providing a concrete instance of the other role. (Note that the concretization in this example may be considered as the inverse of the abstracts relationship 140 from FIG. 1, or stated another way, if a participant "A" abstracts a participant "B", then the participant "B" concretizes the participant "A".) The singleton pattern 520 involves a single role.

Figure 6:
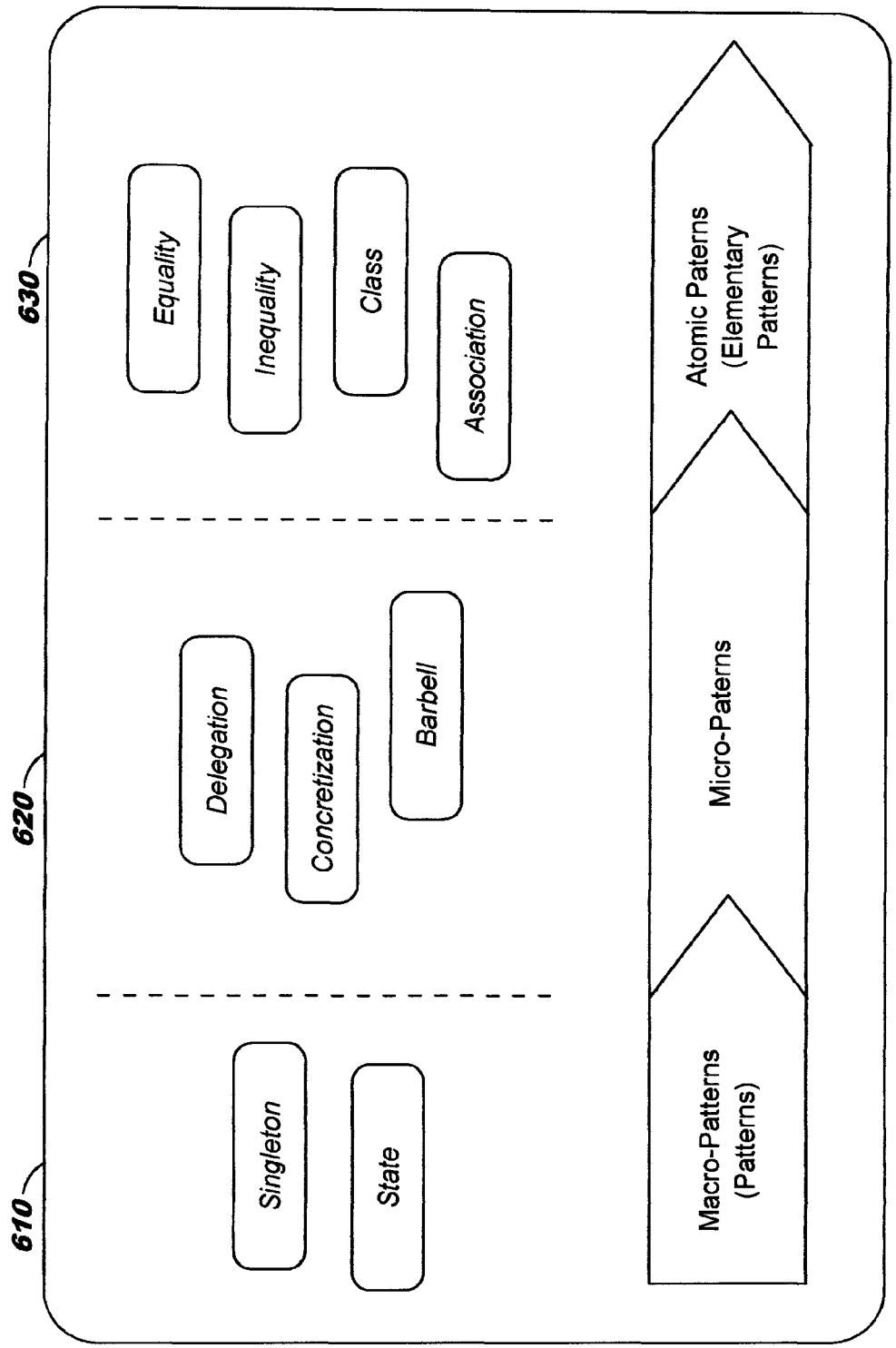
FIG. 6 illustrates an example of the granularity of patterns in respect to their compositional nature with reference to several sample patterns.

While many patterns are composed from other patterns, some patterns cannot be further decomposed into component patterns. These are sometimes referred to as atomic or elementary patterns. While a declarative approach is used for defining patterns that use composition, according to an embodiment of the present invention, the atomic patterns are preferably specified using imperative code from a conventional programming language (and may include programming languages yet to be developed). See FIG. 6, which shows examples of so-called "macro" patterns (see 610), examples of which include state and singleton and which are defined (according to this example) as being composed of other patterns. (A definition of the singleton pattern is not deemed necessary to an understanding of the present invention and therefore has not been provided.) In the general case, macro patterns are those of interest to an end user (such as a programmer or software designer), and may provide interesting and unique semantics for use by such end user. On the other hand, some patterns may be of more use as building blocks from which the macro patterns may be composed. For example, these other patterns may be of less interest for direct usage by an end user, while being useful for enabling a pattern processing tool to accomplish its operation. These other "building block" type patterns may be termed as "micro" patterns and "atomic" patterns. FIG. 6 illustrates micro patterns at 620, and in this illustration, the examples of micropatterns include delegation, concretization, and barbell. The barbell pattern is discussed in more detail below with reference to FIGS. 7-16. The examples of atomic patterns illustrated at 630 in FIG. 6 include equality, inequality, class, and association. These atomic patterns are also discussed in more detail below with regard to the barbell pattern.

Figure 7:
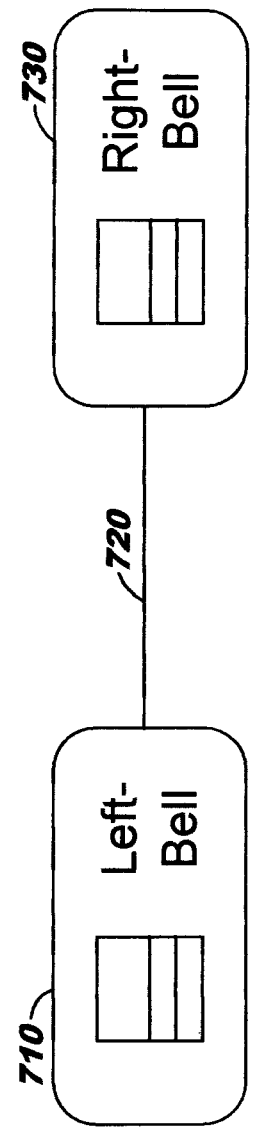

The barbell pattern is discussed herein as another example pattern, and comprises two roles and one relationship. Whereas the sample state pattern is illustrated herein as a macro pattern, the barbell pattern is illustrated as a micro pattern (in recognition that it may be deemed more useful as a building block than as a pattern of interest to an end user, although this characterization is by way of illustration and not of limitation). Referring now to FIG. 7, a graph 700 illustrates the barbell pattern, showing roles 710, 730 and a relationship 720 between them. The sample barbell pattern will now be discussed in more detail.

FIG. 8 illustrates a sample codification 800 of the barbell pattern. The "library" statement 801 specifies where this pattern codification will be stored (i.e., in the "example" library), and "use" statements 810 specify where to find other patterns used by this barbell pattern and in particular, where to find a class, association, and inequality pattern used by the barbell pattern. A "pattern" statement 820 provides a declaration of the barbell pattern, providing its name at 821 and specifying a "composites" attribute that identifies the class pattern 822, association pattern 823, and inequality pattern 824 which are used by this barbell pattern. In other words, the barbell pattern is defined in terms of (or composed from) the class, association, and inequality patterns.

A "structure" definition 830 provides the pattern signature for the barbell pattern, and in this example 800, the structure comprises two roles 840 and one relationship 850. These roles 840 and relationship 850 are as illustrated in FIG. 7, and comprise a "left-bell" role (see 710), a "right-bell" role (see 730), and a "bar" relationship (see 720). The "bar" relationship 850 in this example is between participants that assume the left-bell and right-bell roles 840, and thus the bar relationship definition specifies these role names as parameters in a parenthesized and comma-separated parameter list.

A "behavior" definition 860 specifies constraints on occurrences of barbell pattern 800. That is, the syntax specified at 870 must be in effect (i.e., must be true) for this barbell pattern to be applied. In particular, the syntax at 871 specifies that both the left-bell and right-bell participants must exhibit the class pattern; the syntax at 872 specifies that the "not-equals" relationship (which is presumably defined, in this example, in the "inequality" pattern referenced at 810 and 824) applies to participants assuming the role of left-bell and right-bell (i.e., a single participant cannot fill both roles simultaneously); and the syntax at 873 specifies that the "associates" relationship (which is presumably defined, in this example, in the "association" pattern referenced at 810 and 823) applies to the participants assuming the left-bell and right-bell roles. (As an alternative to the shorthand notation "left-bell, right-bell =class" shown at 871, this syntax may be expressed as "class (left-bell), class(right-bell)".)

Figure 9:
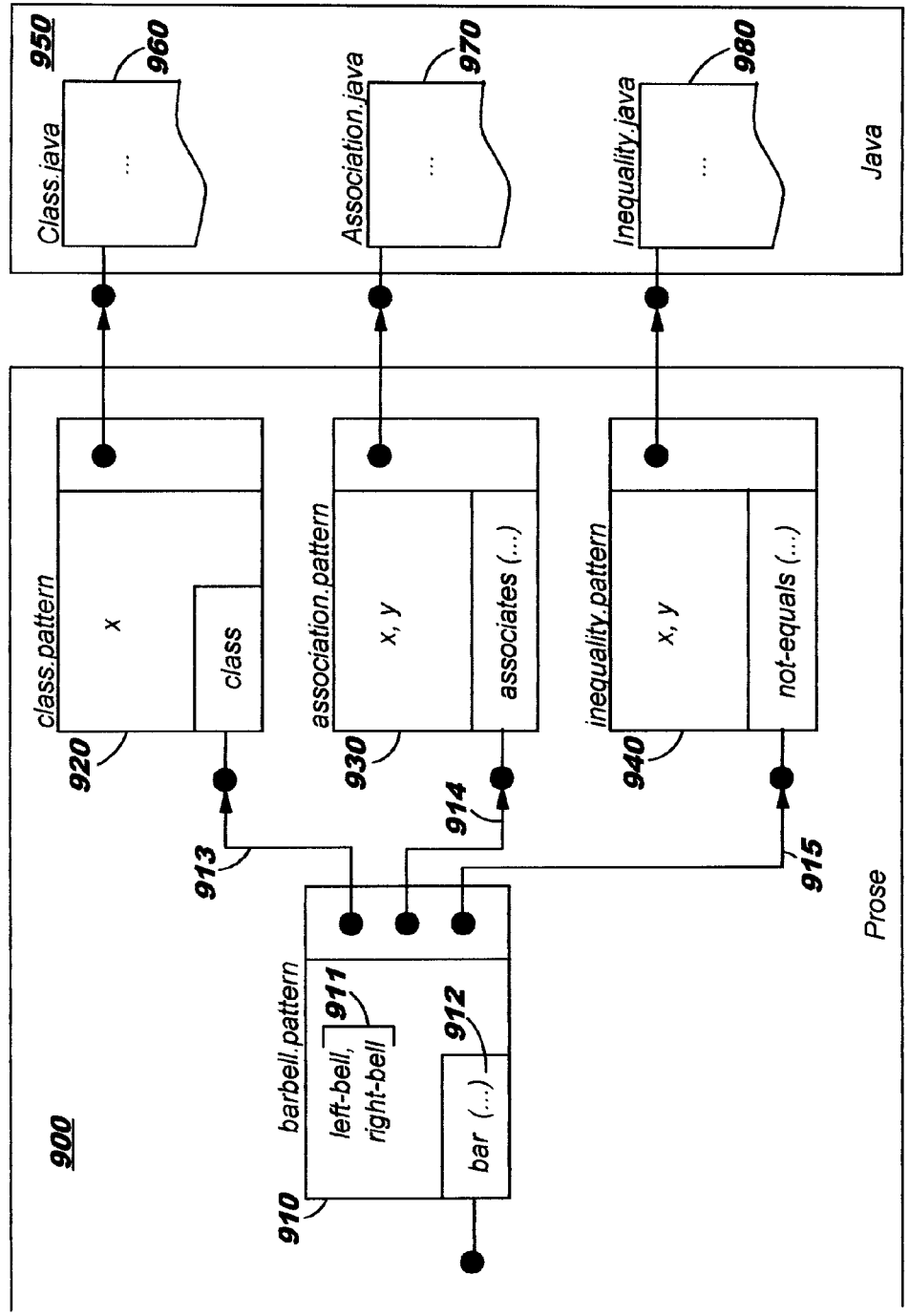
FIG. 9 illustrates a sample pattern composition with regard to the sample pattern from FIG. 7.

FIG. 9 shows an abstract graphical representation of composition of the barbell pattern, illustrating a representation of this pattern in the Prose language (see, generally, 900) as well as an underlying implementation 950 in the Java programming language (by way of illustration but not of limitation) for the atomic patterns used by the barbell pattern. The barbell pattern itself is depicted abstractly at 910, showing the pattern's roles at 911 and relationship at 912. A set of pointers 913, 914, 915 point to graphical representations 920, 930, 940 of the three atomic patterns from which the barbell pattern is composed (as specified in the "pattern" statement at 820 of FIG. 8).

Referring to the graphical representation 920 of the class pattern, for this example, this pattern is shown in FIG. 9 as having a single role named "x" and a single relationship (which may be referred to as a property; see the discussion of reference number 1050 of FIG. 10, below) which is named "class". The graphical representation 930 of the association pattern shows two roles named "x" and "y" and a single relationship named "associates", and the graphical representation 940 of the inequality pattern shows two roles named "x" and "y" and a single relationship named "not-equals". (This illustration also shows that the associates and not-equals relationships use a parameter list, as indicated in the sample codification at 870 of FIG. 8.)

Patterns 920, 930, 940 are depicted at 630 in FIG. 6 as atomic patterns, meaning that they cannot be further decomposed into other patterns (in this example). Accordingly, each of these atomic patterns is implemented, according to an embodiment of the present invention, using code of an imperative programming language. FIG. 9 therefore shows a pointer from each of these atomic patterns to a corresponding Java programming language implementation thereof (References herein to use of the Java programming language, or more generally to use of an object-oriented language, are by way of illustration but not of limitation.) Thus, "Class.java" 960 provides code that implements the class pattern 920, "Association.java" 970 provides code that implements the association pattern 930, and "Inequality.java" 980 provides code that implements the inequality pattern 940. For example, "Inequality.java" 980 may be presumed to include code for evaluating the "not-equals" relationship between two participants that fulfill the "x" and "y" roles (see 940), thereby determining whether those participants are "not-equals" to each other.

FIG. 10 specifies a sample codification 1000 of the class pattern. In the example, the class pattern is an atomic pattern that is referenced at 810 and 822 of FIG. 8 (and is shown abstractly at 920 in FIG. 9). As contrasted to the "pattern" statements 420 of FIG. 4 and 820 of FIG. 8, note that the "pattern" statement 1020 in codification 1000 is prefixed with a "native" attribute (see 1021) and does not specify a "composites" attribute. Accordingly, this statement 1020 identifies an atomic pattern. A "structure" part 1030 and "behavior" part 1060 are specified for the atomic pattern, as in the macro-pattern definition in FIG. 4 and the micro-pattern definition in FIG. 8. The "structure" part 1030 in this example 1000 specifies a single role 1040, having a name of "x" (as also depicted at 920 of FIG. 9), and a "properties" statement 1050 defines "x" as being a class. Note that the syntax within the "structure" part 1030 uses the keyword "properties", in contrast to "structure" part 830 of FIG. 8, which uses the keyword "relations". In the general case, a property is a "1-ary" relation. Because the atomic pattern 1020 has only one role, this role may therefore be characterized using properties rather than relationships. A "behavior" definition 1060 specifies operations 1070 of this atomic pattern 1000, and in this example, a single operation is defined. In this particular example, a wildcard "*" 1072 is used as the condition for a "when" clause 1071, indicating (in this example) that each iteration of this operation will invoke (see 1073) the Java code identified at 1074. As an alternative to use of the wildcard symbol "*" in a when clause, a particular pattern codification may specify other syntax, such as "when 'apply' invoke . . . " or "when 'detect' invoke . . . " to indicate conditions for invoking the recited operation. Multiple "when" statements may be specified in the behavior part of a particular pattern codification, such as both a "when 'apply' . . . " and a "when 'detect' . . . ", thereby indicating that different underlying imperative code can be invoked under different conditions.

FIG. 11 provides sample Java code 1100 that may be invoked responsive to the when clause 1071 of FIG. 10. In this example, the class pattern implements a single operation, which is shown through its implementation of the "Detectable" interface. If the participant bound to the "x" role in the "Class" pattern is of type UML class, then the invocation of code 1100 returns a value of "true".

FIG. 12 specifies a sample codification 1200 of the association pattern. In the example, the association pattern is an atomic pattern that is referenced at 810 and 823 of FIG. 8 (and is shown abstractly at 930 in FIG. 9). The "pattern" statement 1220 is prefixed with a "native" attribute, and does not specify a "composites" attribute, thereby indicating that this statement 1220 identifies an atomic pattern. A "structure" part 1230 and "behavior" part 1260 are specified, as in FIGS. 4, 8, and 10. The "structure" part 1230 in this example 1200 specifies two roles 1240, having names of "x" and "y" (as also depicted at 930 of FIG. 9), and a "relations" statement 1250 specifies a single relationship named "associates" between participants assuming these "x" and "y" roles. A "behavior" definition 1260 specifies operations 1270 of this atomic pattern 1200, and in this example, a single operation is defined. In this particular example, a wildcard "*" 1272 is used as the condition for a "when" clause 1271, indicating that each iteration of this operation will invoke (see 1273) the Java code identified at 1274.

FIG. 13 provides sample Java code 1300 that may be invoked responsive to the when clause 1271 of FIG. 12. In this example, the association pattern implements a single operation, which is shown through its implementation of the "Detectable" interface. If the participants bound to the "x" and "y" roles in the "Association" pattern are related to each other through a UML association, then the invocation of code 1300 returns a value of "true".

FIG. 14 specifies a sample codification 1400 of the inequality pattern In the example, the inequality pattern is an atomic pattern that is referenced at 810 and 824 of FIG. 8 (and is shown abstractly at 940 in FIG. 9). The "pattern" statement 1420 is prefixed with a "native" attribute and does not specify a "composites" attribute, thereby indicating that this statement 1420 identifies an atomic pattern. A "structure" part 1430 and "behavior" part 1460 are specified, as in FIGS. 4, 8, 10, and 12. The "structure" part 1430 in this example 1400 specifies two roles 1440, having names of "x" and "y" (as also depicted at 940 of FIG. 9), and a "relations" statement 1450 specifies a single relationship named "not-equals" between participants assuming these "x" and "y" roles. A "behavior" definition 1460 specifies operations 1470 of this atomic pattern 1400, and in this example, a single operation is defined. In this particular example, a wildcard "*" 1472 is used as the condition for a "when" clause 1471, indicating that each iteration of this operation will invoke (see 1473) the Java code identified at 1474.

FIG. 15 provides sample Java code 1500 that may be invoked responsive to the when clause 1471 of FIG. 14. In this example, if the participants bound to the "x" and "y" roles in the "Inequality" pattern are not equal, then the invocation of "detect" in code 1500 returns a value of "true".

Figure 16:
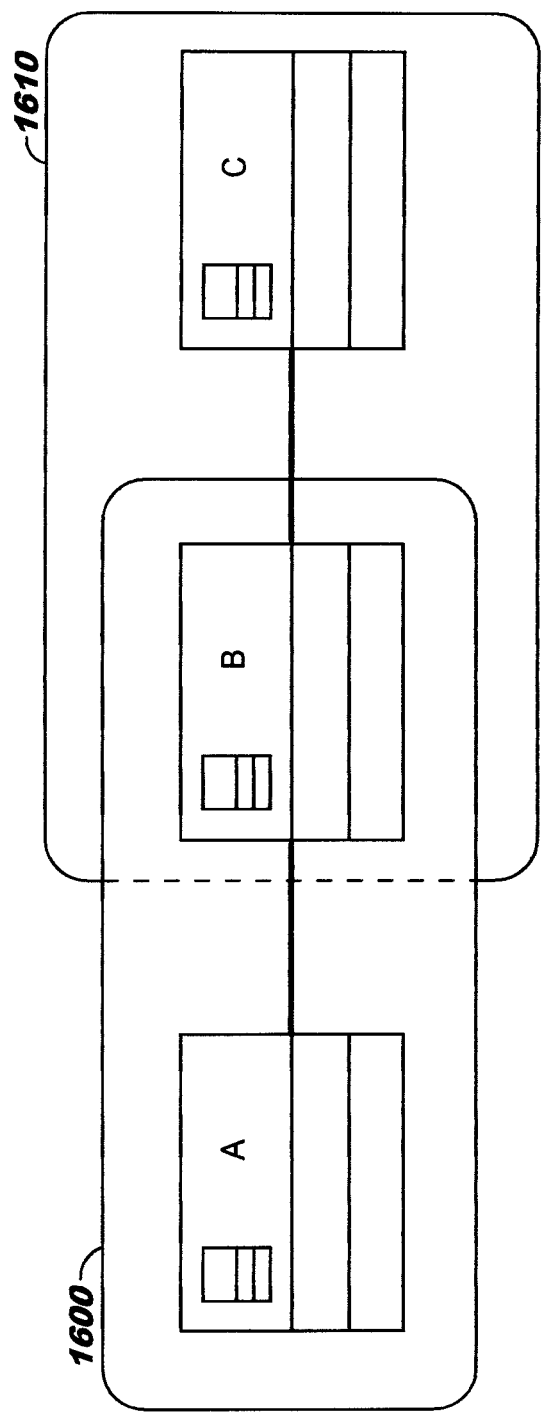
FIG. 16 shows overlapping occurrences of the sample pattern illustrated in FIG. 7.

FIG. 16 illustrates use of two overlapping occurrences 1600, 1610 of the barbell pattern. That is, while a participant "A" assumes the role of left-bell and participant "B" assumes the role of right-bell in a first occurrence 1600 of the barbell pattern, this same participant "B" assumes the role of left-bell in a second occurrence 1610 of the barbell pattern while a different participant "C" assumes the role of right-bell in this second occurrence 1610. (It should also be noted that FIG. 16 may be considered as showing four occurrences of the barbell pattern, because the barbell pattern of the example is sensitive to the order in which the participants are assigned to the roles. Accordingly, occurrence 1600 is distinct from an occurrence where participant "B" assumes the role of left-bell and participant "A" assumes the role of right-bell, and similarly occurrence 1610 is distinct from an occurrence where participant "C" assumes the role of left-bell and participant "B" assumes the role of right-bell.)

Figure 17:
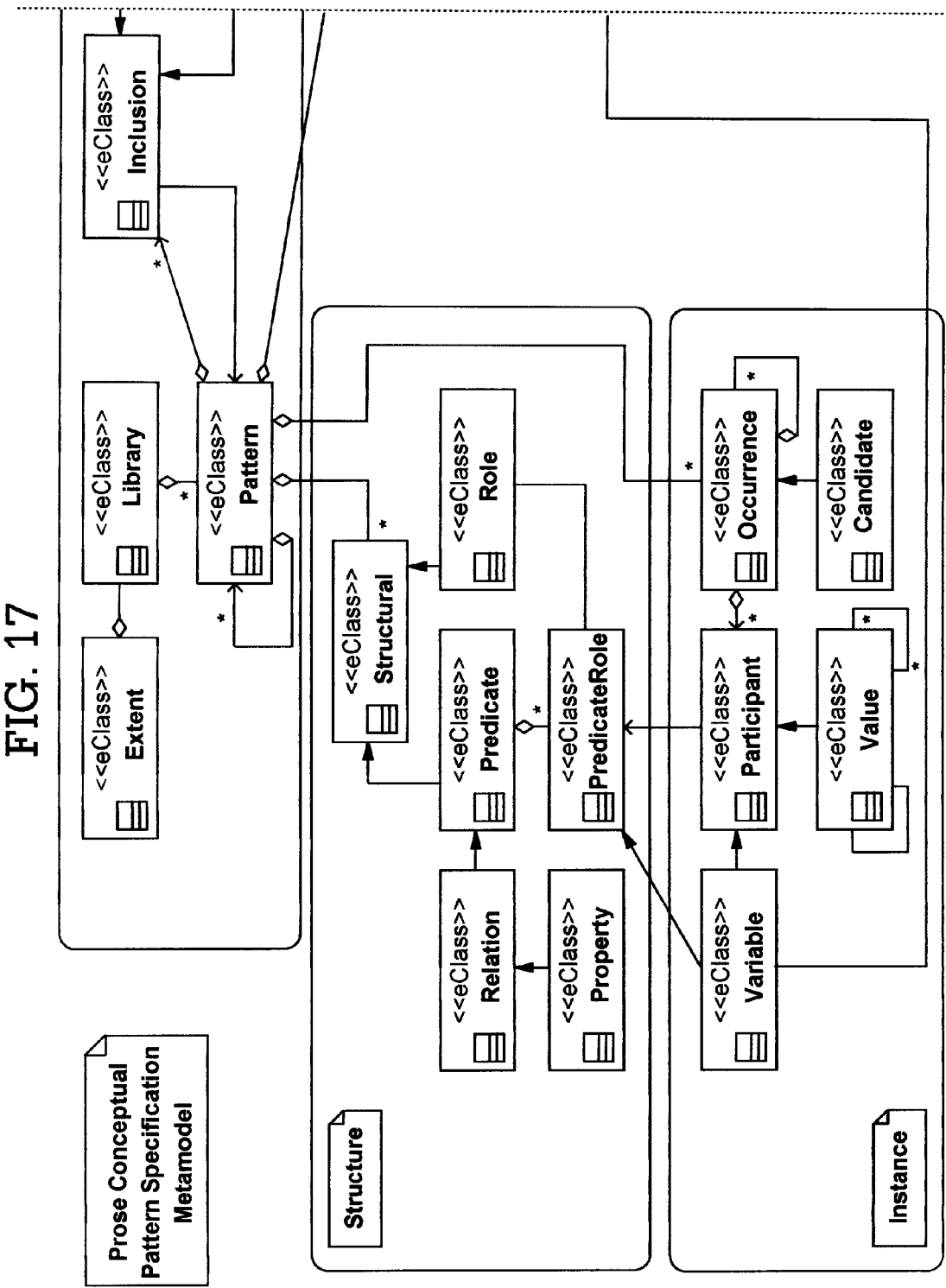
FIG. 17 illustrates a metamodel which may be used with an embodiment of the present invention.
Figure 17:
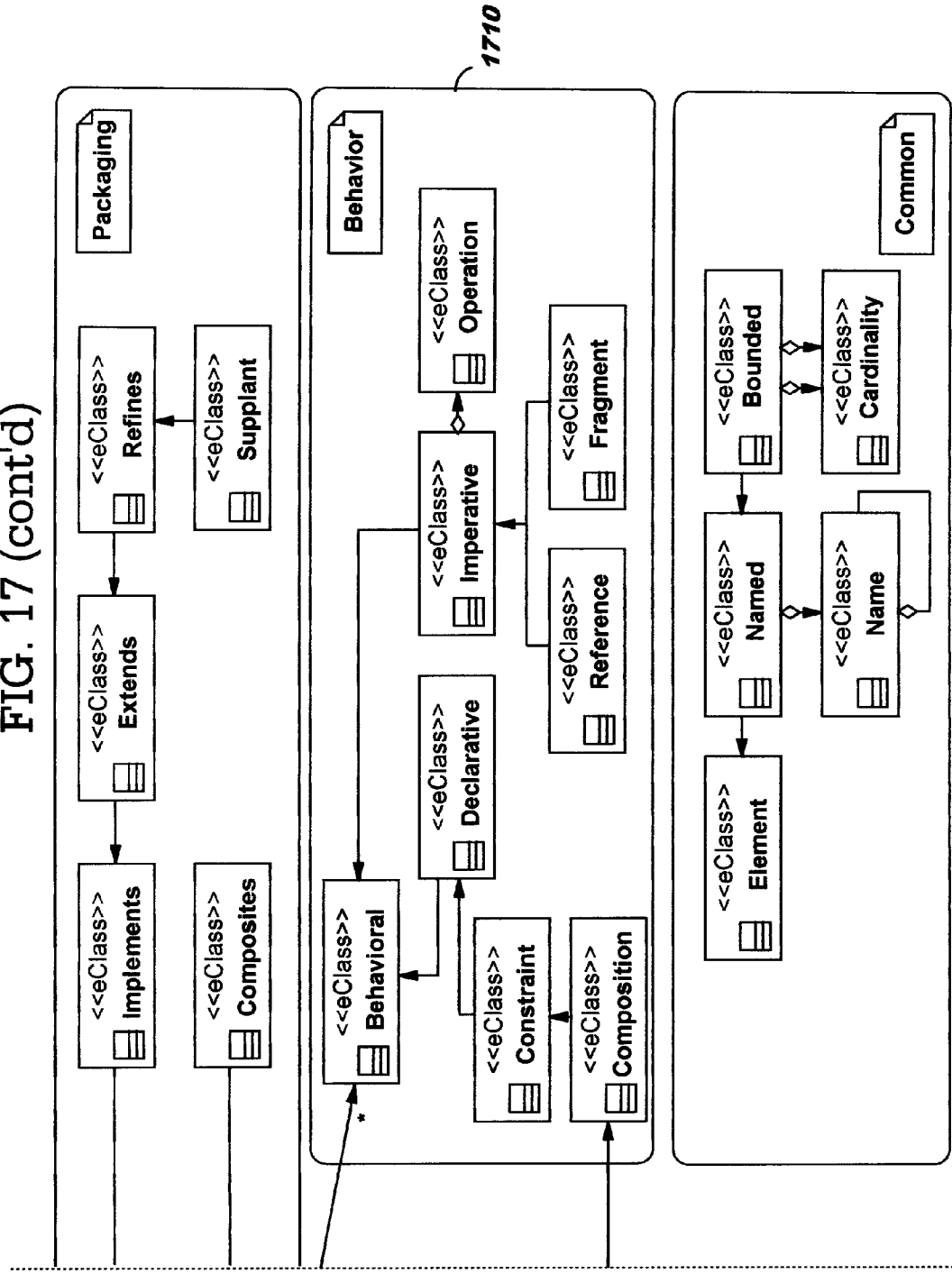

Once a pattern has been specified, it may be applied (which is also referred to herein as making the pattern concrete, or "concretization") by acting upon software elements—such as object-oriented classes—through a metamodel or metamodels that describe the software elements and allow their manipulation. Referring now to FIG. 17, a pattern specification metamodel (or data model) which may be used with an embodiment of the present invention is illustrated therein using UML notation. UML notation is well known to those in the art, and a detailed description herein of FIG. 17 is therefore not deemed necessary.

An embodiment of the present invention may be deployed in an Eclipse environment, leveraging Eclipse plug-ins, and the metamodel of FIG. 17 may be defined using the Eclipse EMF Ecore metamodel. Eclipse is an open development platform from the Eclipse Foundation. Eclipse and EMF are well known in the art, and a detailed discussion thereof is not deemed necessary herein.

Referring now to FIG. 18A, an example 1800 of Java code that programmatically constructs two patterns, "pair" and "string", is depicted (where the "pair" pattern composites the "string" pattern, all in the same library, in this example). This sample code manipulates a pattern at the meta-model level. FIG. 18B shows a sample meta-model pattern representation 1850, representing the same "pair" and "string" patterns using the Prose declarative pattern specification language disclosed herein. As can be seen from FIGS. 18A and 18B, the pattern representation at 1850 is more concise than the programmatically-created code 1800.

In the syntax used at 1860 in FIG. 18B, the "local" attribute is used on a "pattern" statement to indicate that the pattern visibility of the "string" pattern is limited to this one file. Therefore, only the "pair" pattern 1855 can use this "string" pattern 1860. FIG. 18B also illustrates use of "java:fragment" syntax at 1865, which is used in an embodiment of the present invention for inlining Java code (comprising the code at 1870, in this example) that can be executed within a pattern file that does not need to call out to a Java class. (This sample "pair" pattern 1855 outputs whatever string values are bound to the "left" and "right" roles.)

An embodiment of the present invention may be provided, by way of example, in a model-driven development tool that supports modeling of software architecture, design, and implementation; in a requirements management or business process modeling tool; and so forth. As noted earlier, an embodiment of the present invention uses a declarative pattern specification language, and several examples of codifications using this language have been discussed.

Executing a pattern, according to an embodiment of the present invention, comprises interpreting what this pattern means and executing the pattern's operation or operations, as appropriate, on the inputs to the pattern. An embodiment of the present invention may execute patterns using compiled code, interpreted code, or a combination of compiled and interpreted code. An embodiment of an interpreter that processes pattern specifications will now be described with reference to FIGS. 19-25.

Figure 19:
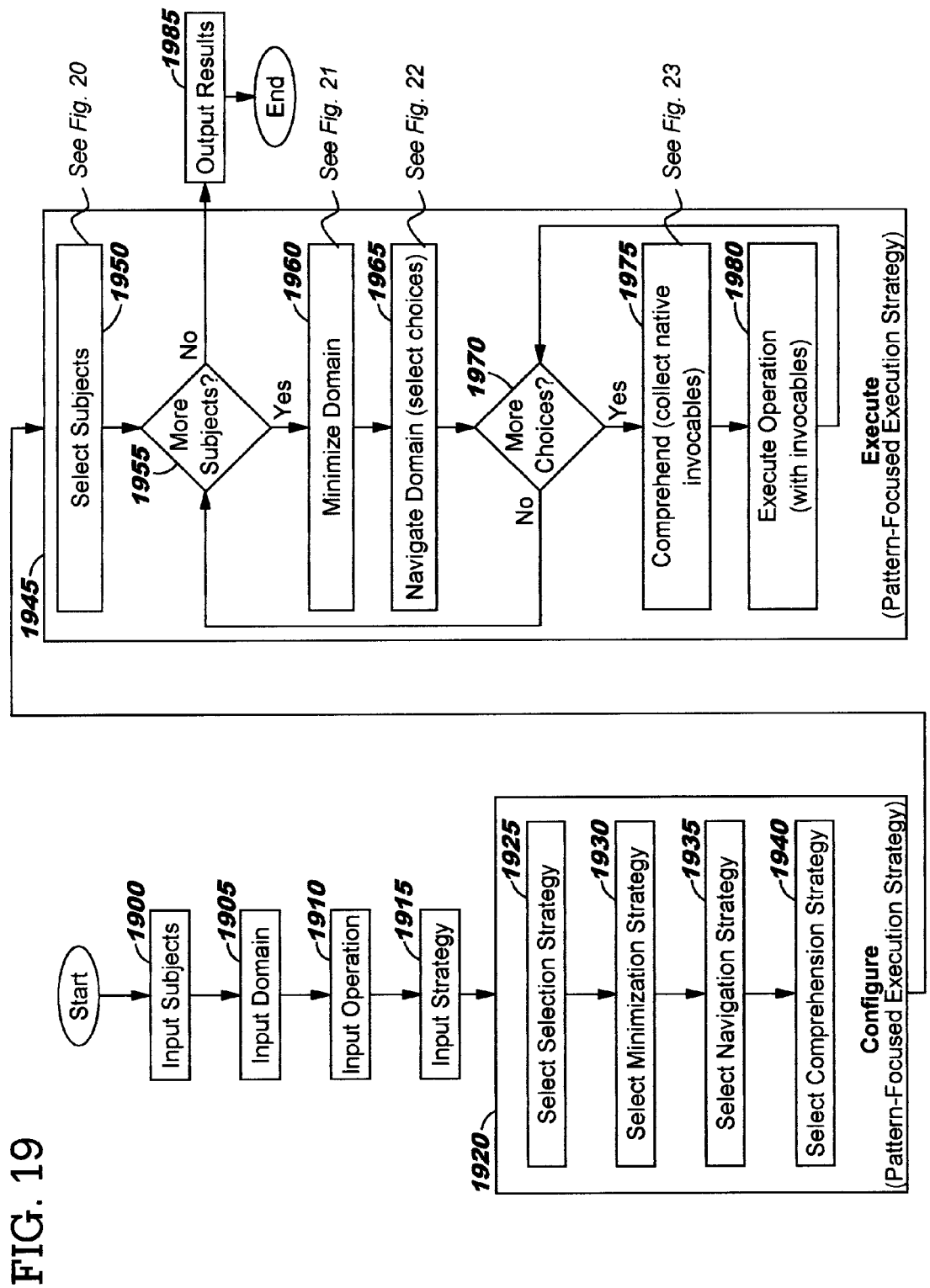
FIGS. 19-25 provide flowcharts depicting logic which may be used when implementing an embodiment of the present invention.

FIG. 19 provides a high-level interpreter execution flowchart. Block 1900 identifies the subjects of interest, Block 1905 identifies the domain or scope of interest, Block 1910 identifies the operation of interest, and Block 1915 obtains an identification of an execution strategy to be used. In one approach, the subjects are patterns; the domain is model elements; a sample operation is "detection" (or "detect"); and the execution strategy is pattern-focused. (As one alternative to use of patterns as the subjects, the subjects might be pattern occurrences; the execution strategy might then be occurrence-focused.) The detection operation, in this approach, detects occurrences of all of the patterns identified at Block 1900 that occur within the scope of the model elements identified at Block 1905. A pattern-focused execution strategy may be automatically selected at Block 1915 due to selecting the detection operation at Block 1910, for example. In the general case, the execution strategy may vary depending on the selections at one or more of Blocks 1900-1910 (e.g., in view of the selected operation).

After making the selections at Blocks 1900-1915, a "configure" process is performed, followed by an "execute" process that outputs results (as will be described in more detail hereinafter). These processes are shown in FIG. 19 at Blocks 1920 and 1945. Logic which may be used when implementing these processes for a pattern-focused execution strategy will now be discussed in more detail with reference to Blocks 1925-1940 and Blocks 1950-1980.

Block 1920 corresponds to configuring a pattern-focused execution strategy. In the depicted approach, this comprises selecting a selection strategy (Block 1925), selecting a minimization strategy (Block 1930), selecting a navigation strategy (Block 1935), and selecting a comprehension strategy (Block 1940), as will now be described in more detail. (When an execution strategy other than pattern-focused is selected at Block 1915, the configuration operations illustrated at Blocks 1920 may vary from those shown.)

At Block 1925, selecting the selection strategy corresponds to determining how to locate the particular patterns that are to be executed. Note that the input from Block 1900 does not necessarily specify which patterns to use; instead, information describing how to get those patterns may be provided. In one approach, a wild card might be used as input at Block 1900 to identify a collection of patterns that are of interest. Preferably, at least one predefined selection strategy is available (which may be, for example, a named process that can be executed) and Block 1925 comprises choosing from among the available predefined selection strategies.

At Block 1930, selecting the minimization strategy corresponds to determining how to minimize or narrow the domain. For example, it may be useful for optimizing a pattern—focused execution to restrict the domain identified at Block 1905 to a subset thereof, in order to focus upon a subset that is useful for the patterns at hand. A particular domain might contain thousands of elements, and it might be deemed useful to narrow this down to several hundred or several dozen elements as a preprocessing step, for example.

A default minimization strategy might be selected (for example, by programmatic means) at Block 1930. As one alternative, a choice may be made from one or more available minimization strategies—for example, by displaying the choices on a graphical user interface ("GUI") and allowing a user to make a selection therefrom.

In one approach, one or more algorithms may be available for narrowing the domain to items of particular interest, including algorithms that perform pattern matching. The algorithms may be provided as pluggable components. Referring by way of example to the barbell pattern discussed above, this barbell pattern has subpatterns comprising class, association, and inequality. (See 822-824 of FIG. 8.) The minimization algorithm might therefore determine that any model element which does not have these subpatterns can be omitted from further consideration, because it will impossible to find the larger pattern (i.e., the barbell pattern) within the group of omitted model elements. Conversely, those domain elements which have the subpatterns may be considered as the result of the minimization.

Some patterns may have subpatterns that are more than one level deep. The state pattern, for example, has subpatterns which are more than one level deep. (See 420 of FIG. 4, where the subpatterns are specified as delegation, concretization, and singleton.) The singleton pattern, for example, is itself composed of patterns. Accordingly, Block 1930 may comprise determining that a minimization approach is to be applied in a recursive or iterative manner.

The navigation strategy selection at Block 1935 corresponds to selecting how to navigate the domain to look for occurrences of the patterns of interest. A number of navigation approaches may be used, without deviating from the scope of the present invention. Generally, a list or other data structure identifying the elements of the model is available (or can be generated programmatically). This list or data structure may be used in a brute force analysis, in one approach, for navigating the domain. Referring again to the barbell pattern discussed earlier, recall that this pattern has two roles. A brute force navigation with regard to the barbell pattern may therefore comprise taking all combinations of two model elements and then evaluating those pairs of elements to determine whether the pattern is matched (as will be discussed in more detail below). The example state pattern has more roles, and therefore uses more elements from the model at each evaluation.

A default navigation strategy might be selected (for example, by programmatic means) at Block 1935. As one alternative, a choice may be made from one or more available navigation strategies—for example, by displaying the choices on a GUI and allowing a user to make a selection therefrom.

The comprehension strategy selection at Block 1940 corresponds to determining how to comprehend a pattern. In one approach, this may comprise determining that comprehending a pattern will be done by stepping through the hierarchy or levels of subpattern compositions for a particular pattern, evaluating the parts of the pattern specification to determine what it means for this pattern to be exhibited in model elements. The patterns are preferably stored in memory when evaluated by an embodiment of the present invention, and the definitions and formats of the instances of the metamodel are readily available. In the general case, model elements will be plugged in as values of the pattern, as potential pattern participants; the pattern is then evaluated to see if these potential participants uphold all of the constraints specified in the pattern codification.

A default comprehension strategy might be selected (for example, by programmatic means) at Block 1940. As one alternative, a choice may be made from one or more available comprehension strategies—for example, by displaying the choices on a GUI and allowing a user to make a selection therefrom.

After performing the configuration represented by Block 1920, the pattern-focused execution strategy executes at Block 1945. In the general case (i.e., for all execution strategies), the execute process at Block 1945 preferably comprises selecting actual occurrences at Block 1950 and then evaluating those occurrences.

In the depicted approach, the execution at Block 1945 comprises an iterative process that includes selecting a subject or subjects (Blocks 1950-1955) using the selection strategy chosen at Block 1925, minimizing the domain (Block 1960) using the minimization strategy chosen at Block 1930, navigating the domain (Block 1965) using the navigation strategy chosen at Block 1935, and then iteratively evaluating choices (Block 1970) by performing a comprehension (Block 1975) using the comprehension strategy chosen at Block 1940 and executing the selected operation (Block 1980). Following completion of Block 1945, Block 1985 outputs the result of this execution. For example, in the case where the operation is detection and the subject is one or more patterns, Block 1985 outputs detected occurrences of those patterns. As another example, if the subject is occurrences, the operation might be "count" (e.g., to count the number of occurrences of some pattern), in which case Block 1985 outputs the count value.

The execute process at Block 1945 will now be described in more detail with reference to Blocks 1950-1980.

Figure 20:
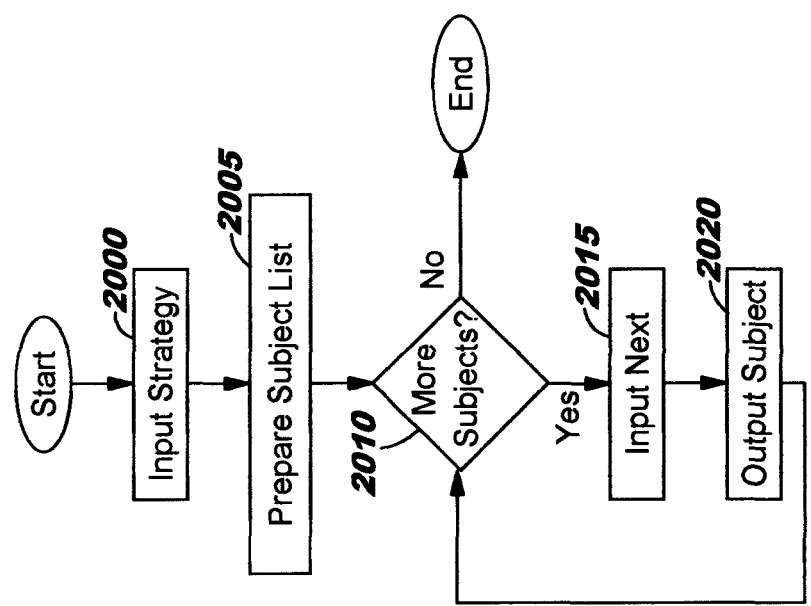

Selecting subjects at Block 1950 comprises, according to an embodiment of the present invention, selecting actual subjects in view of the selections made at Blocks 1900-1925. For example, when patterns are selected as the subjects, then Block 1950 comprises selecting the actual pattern definitions to be used for the operation of interest. Referring now to FIG. 20, the processing of Block 1950 will be discussed in more detail.

FIG. 20 corresponds to the "select subjects" node at Block 1950 of FIG. 19, and obtains an input strategy for selecting a subject or subjects at Block 2000. In one approach, a default subject selection strategy is used, which in one embodiment is selection of a specific pattern. As one alternative to using a default subject selection strategy, a choice may be made from one or more available strategies—for example, by displaying the choices on a graphical user interface ("GUI") and allowing a user to make a selection therefrom. A strategy might indicate, for example, a method that indicates how to find a subject or subjects.

A goal of the subject selection strategy is to select the subjects to be used in the primary execution flow 1945 of FIG. 19. Using the selected strategy, Block 2005 prepares a subject list. The list preferably comprises a list of patterns to try to detect, when the subject is patterns and the operation is detection. As another example, if the subject is occurrences and the operation is "count", then the list may comprise the list of occurrences to be used in the counting.

The processing at Block 2005 may comprise iteratively adding available patterns to the subject list, in preparation for subsequently determining whether they are candidates for a current execution. In another approach, a user may be allowed to select patterns from a GUI display for adding to the subject list. Each of the subjects on the subject list will be individually selected and returned to the mainline processing of FIG. 19 using the loop at Blocks 2010-2020. Accordingly, Block 2010 tests whether there are more subjects on the list for processing according to FIG. 20. If not, then control returns from Block 2010 to the invoking logic (i.e., in FIG. 19). Otherwise, when the test at Block 2010 has a positive result, then processing continues to Block 2015. In one embodiment, Block 2015 waits until the invoking code asks for the next member from the subject list. Block 2015 then obtains the next subject from the list, after which Block 2020 then returns that subject for processing by the execution logic in FIG. 19. In effect, the loop at Blocks 2010-2020 hands off the subjects one at a time to the invoking logic. Following execution of Block 2020, the processing of FIG. 20 returns to Block 2010 to see if there are more subjects remaining on the subject list.

After FIG. 20 returns a subject to the mainline processing of FIG. 19, Block 1955 tests whether there are any more subjects to be evaluated. When this test has a negative result, control transfers to Block 1985 where results of the processing are provided as output (as discussed above). Otherwise, when the test at Block 1955 has a positive result, processing continues at Block 1960, as will now be described with reference to FIG. 21.

Figure 21:
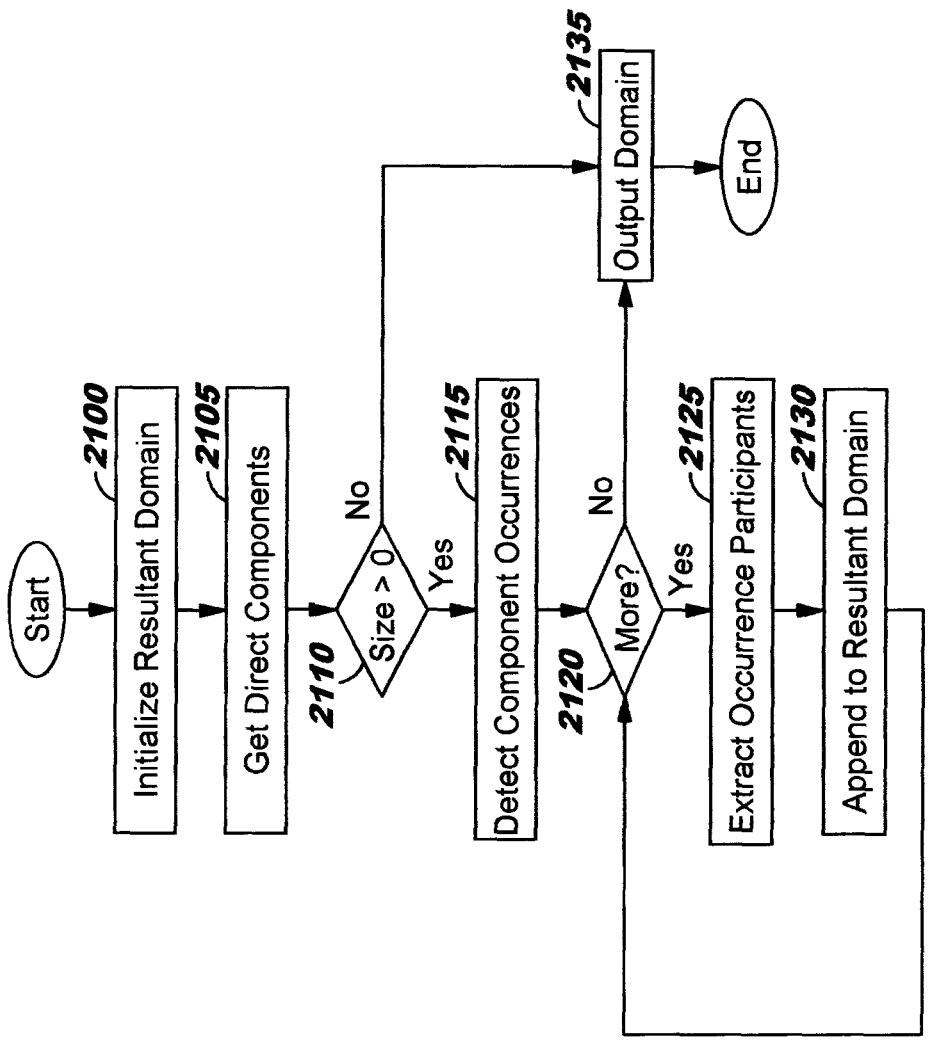

FIG. 21 corresponds to the "minimize domain" node at Block 1960 of FIG. 19. Block 2100 obtains an input strategy for minimizing the domain. In one approach, a default domain minimization strategy is used (and one embodiment thereof is illustrated in FIG. 21), in order to reduce the number of domain elements to be considered as candidates (e.g., to improve performance by reducing the size of a combinatorial expansion that results from selecting domain elements in various combinations). In particular, when the subject is patterns and the operation is detection, all model elements that cannot satisfy this pattern are preferably removed from consideration during the processing of FIG. 21. Selecting a default minimization strategy or a user-selectable strategy (as one alternative) was discussed earlier with reference to Block 1930 of FIG. 19.

FIG. 21 will be described with regard to a default minimization strategy for use when the subject is patterns. Block 2100 initializes the resultant domain. This preferably comprises initializing a data structure to hold the new, minimized version to be created for the domain selected at Block 1905. Block 2105 then gets the direct components of the pattern currently being evaluated, and preferably builds a data structure which is referred to herein (by way of example) as a list to represent these direct components. A "direct" component is a pattern at the next lowest level in a pattern composition hierarchy, going one level deep into that hierarchy. With reference to the sample state pattern, for example, the direct components are the delegation, concretization, and singleton patterns (as shown at 422-424 in FIG. 4), and processing of Block 2105 comprises adding these direct components to a list for subsequent evaluation. Note that an alternative embodiment may delay instantiation of at least some underlying patterns—for example, by obtaining a subset of the direct components at Block 2105 or by limiting the depth for which underlying patterns are evaluated—without deviating from the scope of the present invention, although this has not been illustrated in FIG. 21.

Block 2110 tests whether the result of Block 2105 is a list of size greater than zero. If not, then the pattern currently being evaluated has no composites (i.e., it is an atomic pattern), and control transfers to Block 2135, which outputs the minimized domain that has been created. This minimized domain will then be used in the subsequent processing in FIG. 19. Otherwise, when the test at Block 2110 has a positive result, processing continues at Block 2115.

Block 2115 detects component occurrences for each of the direct components on the list created at Block 2105. This preferably comprises recursively invoking the processing of FIG. 19, in turn, for each of the direct components. Referring again to the sample state pattern, the processing of FIG. 19 is recursively invoked from Block 2115 for the delegation pattern, and for the concretization pattern, and also for the singleton pattern (and the order of these recursive invocations may vary).

Block 2120 tests whether there are more occurrences of the currently-evaluated one of the direct components. For example, with regard to evaluating the delegation pattern as a direct component of the sample state pattern, Block 2120 tests whether there are more occurrences of this delegation pattern that are yet to be processed. If the test at Block 2120 has a negative result, then control transfers to Block 2135 to output the minimized domain and the processing of FIG. 21 then ends. Otherwise, when the test at Block 2120 has a positive result, processing continues at Block 2125 to extract occurrence participants. As noted earlier, the participants are domain elements from the original (i.e., non-minimized) domain which may fulfill roles of the pattern. In order to find a pattern occurrence, it is necessary to find occurrences of all of the patterns of which that pattern is composed, and thus domain elements will be evaluated to determine if they can fulfill roles of the direct patterns. If a particular domain element is able to fulfill a pattern role, then that domain element is appended to the resultant (i.e., minimized) domain at Block 2130.

Returning again to FIG. 19, following the domain minimization at Block 1960, Block 1965 navigates the minimized domain to select choices therefrom, as will now be described with reference to FIG. 22.

Figure 22:
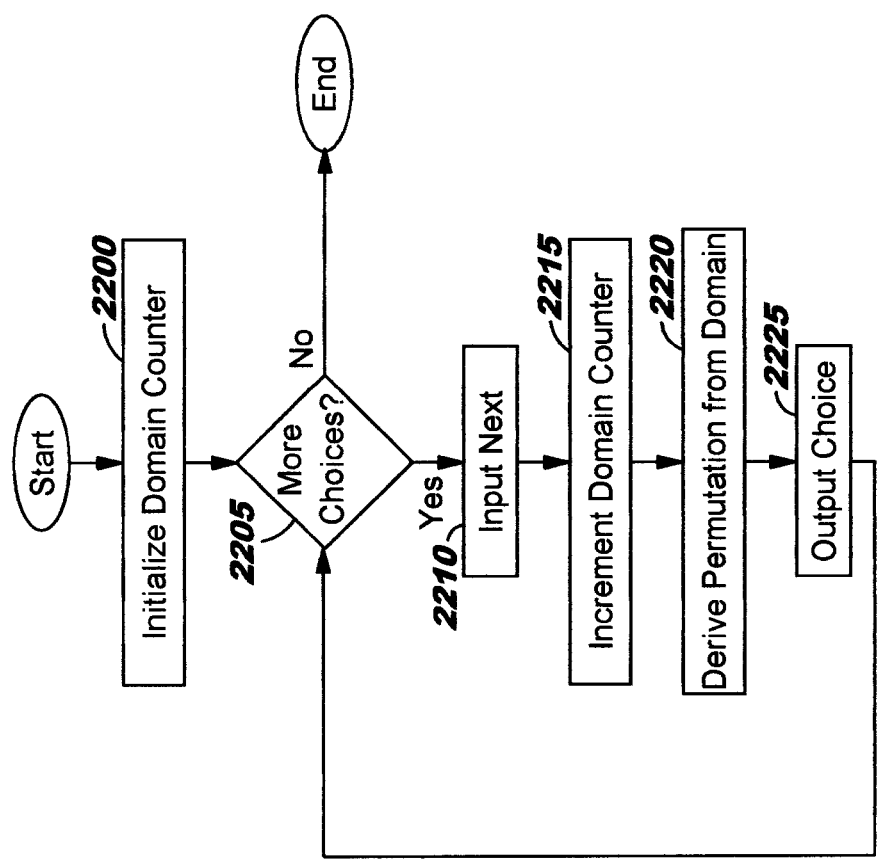

FIG. 22 corresponds to the "navigate domain" node at Block 1965 of FIG. 19. Selecting a default navigation strategy or a user-selectable strategy (as one alternative) was discussed earlier with reference to Block 1935 of FIG. 19. In one approach, a default domain navigation strategy is used, and one embodiment of this default strategy is illustrated in FIG. 22. A goal of the domain navigation strategy is to traverse the domain elements of the minimized domain in such a way as to satisfy the requirements of the operation of interest. In particular, the default navigation strategy shown in FIG. 22 uses exhaustive permutation, ensuring that all elements of the minimized domain are encountered one and only one time.

The strategy for navigation may indicate, for example, how many domain elements are to be considered at one time for candidates of a pattern being evaluated, and how to select those domain elements (e.g., using a combinatorics approach, or permutations, and so forth). FIG. 22 uses the term "choice" to refer to one or more element chosen from the minimized domain as the strategy navigates over the domain. The choice size is the number of elements chosen at one time, and forms a choice list. In the general case, the choice list is duplicate-allowed permutations of the minimized domain (i.e., the domain from Block 1905, as minimized by the processing in FIG. 21).

Suppose, for example, that the sample state pattern is being evaluated. This state pattern has 3 different roles (as depicted at 440 in FIG. 4). Accordingly, 3 domain elements are to be evaluated at a time as candidates for fulfilling these roles. The 3 domain elements will be plugged in to the state pattern, which will then be executed (as discussed below with reference to Blocks 1975-1980 of FIG. 19) to see if all constraints of the state pattern (as well as all constraints of its composite patterns) are satisfied by these 3 domain elements. If so, then those 3 domain elements constitute an occurrence of the state pattern; if not, then a different collection of 3 domain elements are selected by navigating the domain and that collection is processed in an analogous way, and this process repeats until all appropriate ones of the domain elements have been evaluated. A first collection of 3 domain elements might be represented, using a triplet notation, as <1, 1, 1>. This notation indicates that some domain element identified as "1" is proposed for fulfilling each of the 3 roles of the state pattern. A next-evaluated collection of domain elements might be <1, 1, 2>, indicating that a different element identified as "2" is proposed for fulfilling the third role while the same domain element identified as "1" is proposed for fulfilling the first and second roles.

The domain navigation process begins at Block 2200, which initializes a domain counter. This domain counter is preferably a data structure configured for keeping track of the permutations of domain elements which are evaluated, in view of the number of roles to be fulfilled (and note that the term "counter" is not used in the sense of an integer count). In one approach, a varying radix data structure may be used for the domain counter.

Each of the collections of domain elements will be individually selected and returned to the mainline processing of FIG. 19 using the loop at Blocks 2205-2225. Accordingly, Block 2205 tests whether there are more permutations of domain elements yet to be evaluated (e.g., whether any of the permutations represented by the domain counter have yet to be processed). If not, then processing in FIG. 22 ends; otherwise, processing continues at Block 2210.

In one embodiment, Block 2210 waits until the invoking code asks for the next permutation of domain elements. Block 2215 then increments the domain counter, such that it can be used for finding a next one of the permutations (i.e., collections of domain elements) for evaluating. Block 2220 then derives a permutation from the domain, according to the domain counter. That is, candidates are selected from the domain elements in accordance with this permutation. So, if the permutation is a triplet of the form <1, 2, 3>, then the domain elements corresponding to the identifiers "1", "2", and "3" are located. The entries in the permutation might be index values, for example, in which case those index values are used to locate the corresponding domain elements. Block 2225 returns that collection of domain elements to the processing in FIG. 19, after which control returns to Block 2210 to determine if there are any more permutations (or more generally, any choices) to be evaluated.

Returning again to the discussion of FIG. 19, the navigating that is invoked at Block 1965 is followed by testing, at Block 1970, whether there are more choices (i.e., whether the processing of FIG. 22 returned a collection of elements, chosen from the minimized domain as the strategy navigates over the domain, for evaluating to see if those elements can satisfy the constraints of the pattern). If this test has a negative result, indicating that all of the choices have already been processed, then control returns to Block 1955 to determine whether there are any more subjects to be evaluated. Otherwise, when the test at Block 1970 has a positive result, Block 1975 performs a comprehension on that collection, as will now be discussed with reference to FIG. 23.

Figure 23:
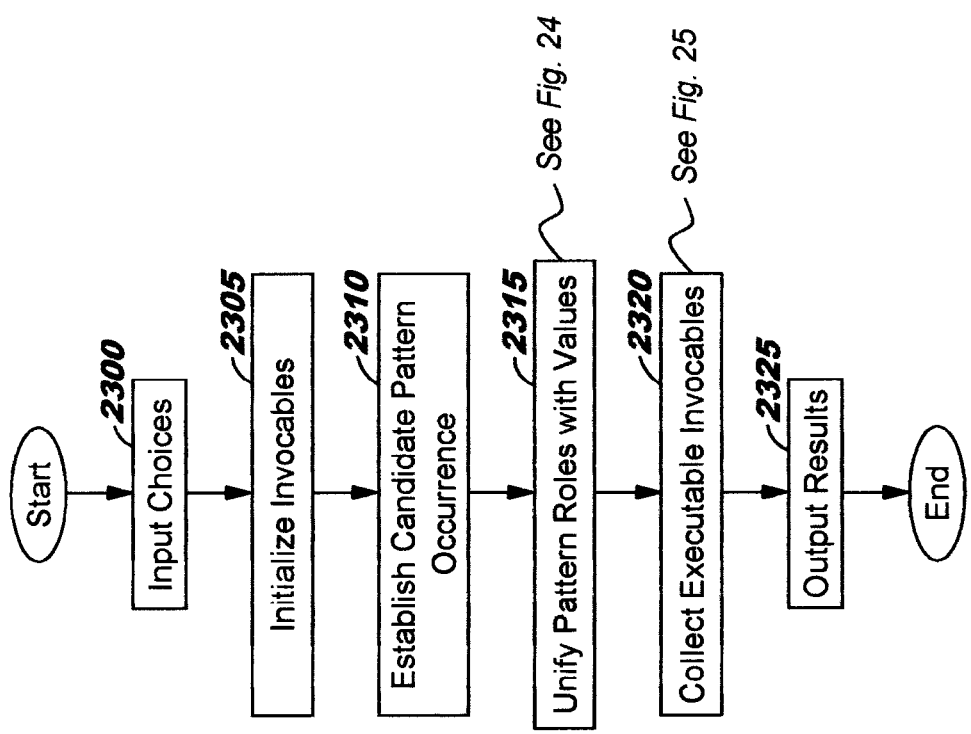

FIG. 23 corresponds to the "comprehend" node at Block 1975 of FIG. 19. Selecting a default comprehension strategy or a user-selectable strategy (as one alternative) was discussed earlier with reference to Block 1940 of FIG. 19. In one approach, a default comprehension strategy is used, and one embodiment of this default strategy is illustrated in FIG. 23. A goal of the comprehension strategy is to comprehend the active operation (e.g., detection) in the context of the other inputs (such as the selected subject and chosen domain elements). The default strategy shown in FIG. 23 comprehends the entire pattern and context.

Input to FIG. 23 comprises a set of candidate domain elements, referred to in Block 2300 as choices, which are to be plugged into the pattern being evaluated (i.e., in place of the variables of the pattern). This input is preferably created by FIG. 22 as a collection or permutation, as has been discussed above. Block 2305 initializes invocables. This preferably comprises initializing a data structure that keeps track of things that are to be executed. Block 2310 establishes a candidate pattern occurrence. This preferably comprises proposing a collection of domain elements as candidates for fulfilling the roles of the pattern, and in particular, a collection as returned from FIG. 22 is preferably used for the proposed pattern participants. Block 2315 then unifies the pattern roles with values (i.e., plugs the values into the roles) and Block 2320 collects executable invocables. The collecting at Block 2320 may comprise appending the executable invocables to a list or other data structure, and this collection is then returned as output at Block 2325. Note that Block 2320 is not actually executing the invocables, but instead operates as a pre-fetch for the collection of invocables that may potentially be invoked (e.g., during processing of Block 1980 of FIG. 19). These processing of Blocks 2315-2320 is described in more detail with reference to FIGS. 24-25, respectively, as will now be described.

Figure 24:
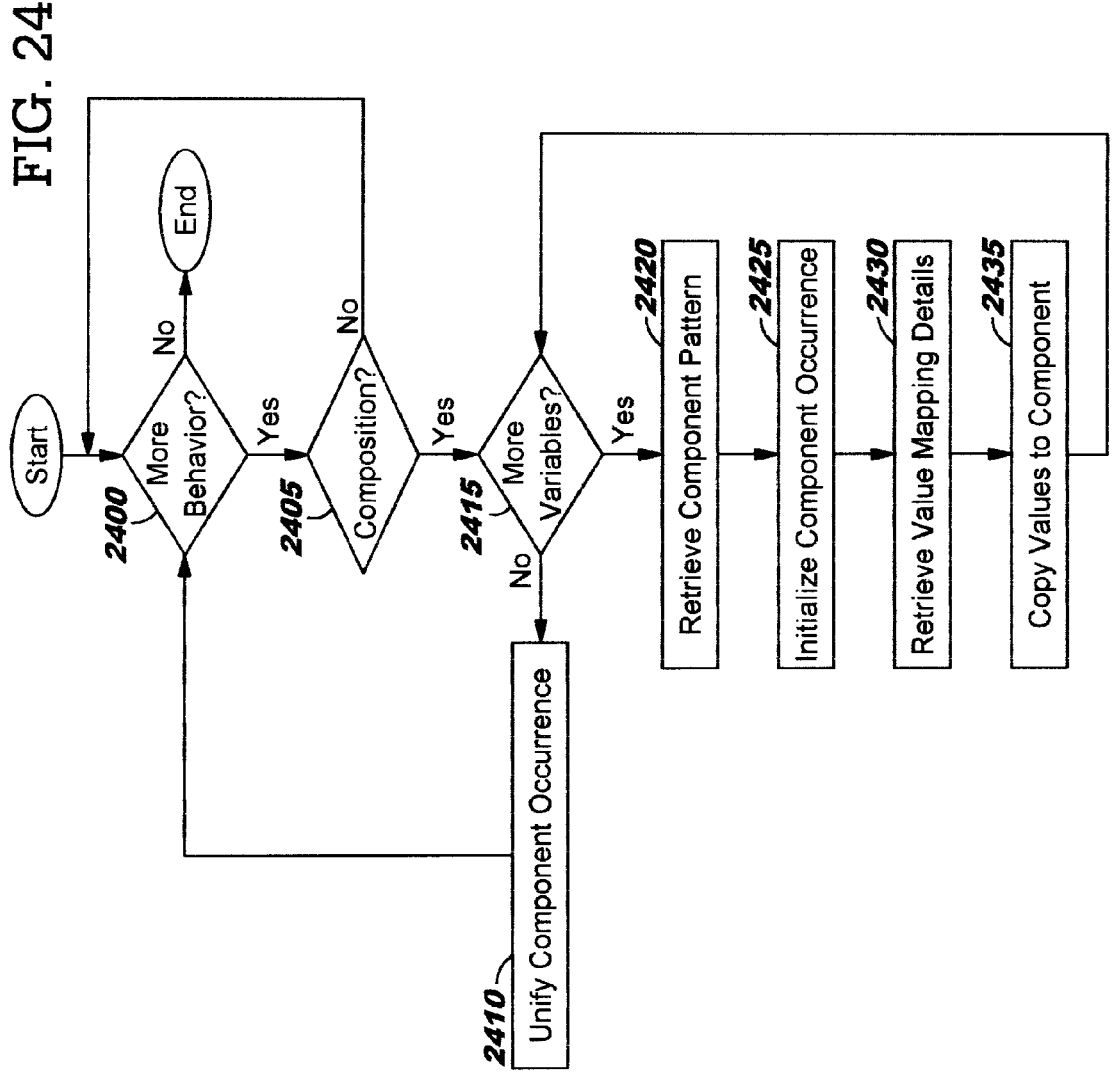

FIG. 24 illustrates a unification process that may be performed during comprehension to unify participant values with variables that are mapped to the roles of a subject pattern. Note that inputs to this processing are determined in the comprehension processing of FIG. 23, from which FIG. 24 is invoked. Block 2400 tests whether there are more behaviors to evaluate. Preferably, this comprises testing whether the pattern of interest has behavior defined in the behavior section of the pattern codification (as illustrated at 460 of FIG. 4, for example). If not (for example, because an atomic pattern has been reached at the lowest level of the composition hierarchy for a particular pattern), then processing of FIG. 24 ends; otherwise, Block 2405 tests whether the behavior type in the pattern of interest is composition. (As one alternative to composition behavior, a pattern codification might include another of the types shown at 1710 in FIG. 17. For example, a "reference" type may be used for atomic patterns, such as the "when" statement 1271 of FIG. 12.) If the test at Block 2405 has a positive result, then processing continues at Block 2415, and otherwise, controls returns to Block 2400.

The processing at Blocks 2410-2435 iterates over the variables in the pattern codification. (Note that atomic patterns will not reach this iterative processing.) In particular, when the subject is patterns, these variables correspond to the pattern roles or predicate roles. Simple pattern roles are defined in "roles" syntax of the structure section (see, for example, reference number 440 of FIG. 4) whereas predicate roles are referenced in the "relations" syntax of the structure section (see, for example, reference number 450 of FIG. 4). To begin this iteration, Block 2415 tests whether there are any more variables in the pattern being evaluated. If not, then at Block 2410, a recursive call is preferably made, invoking FIG. 24 with the component occurrence which has been mapped by the current invocation of FIG. 24 during execution of Blocks 2420-2435, thereby unifying the component occurrence with the proper values. Otherwise, when there are more variables (i.e., the test at Block 2415 has a positive result), processing continues at Block 2420.

Block 2420 retrieves a component pattern, and Block 2425 initializes a component occurrence for that pattern. With regard to the sample barbell pattern of FIG. 8, for example, the processing of Blocks 2420-2425 comprises retrieving the definition of each of the class, association, and inequality patterns and initializing an occurrence for each pattern according to those definitions. Block 2430 then retrieves value mapping details and Block 2435 uses those details to copy (i.e., map) values for a variable to a component pattern. With reference to the sample barbell pattern, for example, this pattern has 2 roles, namely left-bell and right-bell, and domain elements are therefore to be plugged into these roles of the outermost pattern, and then evaluated to see if those domain elements meet the constraints of each inner pattern. According to the definition of the sample barbell pattern, this requires that the domain element proposed for left-bell and right-bell maps to something in the class pattern (as indicated by the first statement 871 of the constraints specified at 870 of FIG. 8). The processing at Block 2430 comprises determining how the domain elements used for left-bell and right-bell are mapped to variables of the class pattern, in the barbell example, and the processing at Block 2435 comprises copying the values from the outer pattern to the variables of the inner pattern using this mapping.

Following the copying at Block 2435, control returns to Block 2415 to test whether there are more variables in the pattern codification being evaluated. If so, then the processing of Blocks 2420-2435 is repeated and if not, control then transfers to Block 2410.

Figure 25:
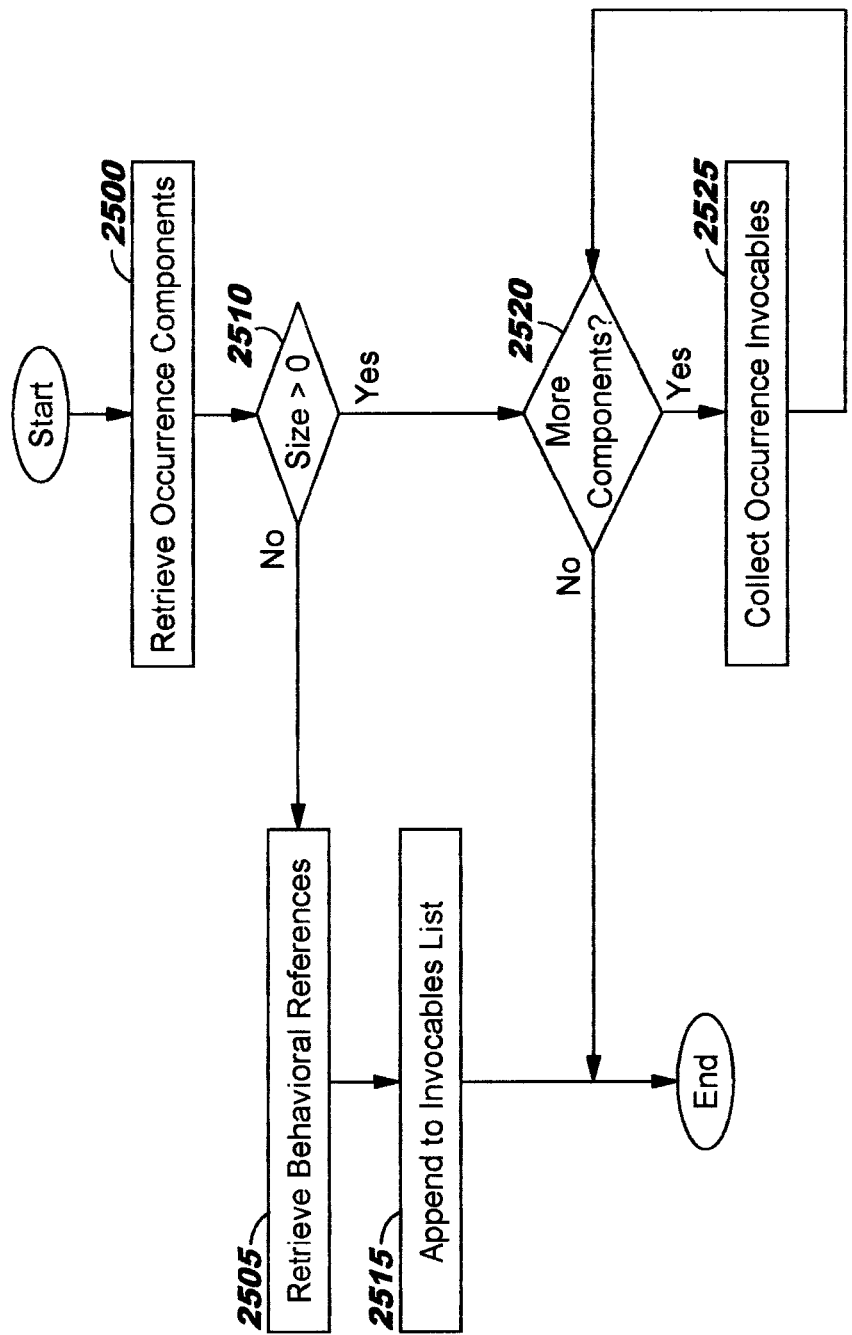

FIG. 25 illustrates a process for collecting executable invocables, and is invoked from Block 2320 of FIG. 23. Note that inputs to this processing are determined in the comprehension processing of FIG. 23, from which FIG. 25 is invoked. Block 2500 retrieves occurrence components. With reference to the sample barbell pattern, this comprises getting the definitions of the class, association, and inequality component patterns. Block 2510 tests whether the size of the result is greater than zero. If not, then the bottom level of the pattern composition hierarchy has been reached, and processing then transfers to Block 2505 which retrieves behavioral references for the components—that is, obtaining the invocable behaviors for those components—after which Block 2515 appends those invocables to a list or other data structure. Processing of FIG. 25 then ends, and the list that results from Block 2515 is available for subsequent evaluation (e.g., by being returned as output from Block 2325 of FIG. 23). Note that the list created by executing FIG. 25 has entries for each possible collection of domain elements which have been determined as potential participants for the roles of the pattern being evaluated and represents a list of all the code that is to be executed to determine which collections of domain elements constitute occurrences of the pattern of interest. (This list will then be used at Block 1980 of FIG. 19, as discussed below.)

For example, with reference to the sample barbell pattern, the processing of Block 2505 in an iteration of FIG. 25 obtains the "java:com.ibm.prose.content.uml.Class$" statement found at 1074 of FIG. 10 when processing the class component pattern. (It may happen that the list created at Block 2515 when comprehending a pattern has a single invocable behavior, for example if the pattern is atomic.)

Otherwise, when the test at Block 2510 has a positive result, processing continues at Block 2520 which tests whether the pattern definitions retrieved at Block 2500 have their own components. If not, then the processing of FIG. 25 ends, and otherwise, Block 2525 recursively invokes the processing of FIG. 25 with the component occurrence and its components to evaluate the invocables that may be found therein. Processing then returns to Block 2520, which determines whether the lowest level has been reached (thus indicating that the recursion is at an end).

Returning again to the discussion of FIG. 19, following the comprehend processing invoked from Block 1975, the operation of interest is executed at Block 1980 using the invocables that were determined—for example, as indicated by the list returned as output at Block 2325 of FIG. 23. This preferably comprises executing each of the invocables on the list that pertain to each of the collections of candidate participants for the pattern of interest. If all of the constraints of the pattern are satisfied, according to the pattern definition, and all of the constraints of the component patterns are satisfied, according to the definitions of the component patterns, then the detection operation concludes that this pattern is detected with regard to those candidate participants; otherwise, the collection of candidate participants is rejected. After performing an execute at Block 1980, an embodiment returns control to Block 1970 to test whether more choices (e.g., another collection of domain elements, as returned from Block 2225 of FIG. 22) remain to be analyzed. If so, the comprehend and execute processes of Blocks 1975 and 1980 are performed for another choice. Otherwise, when there are no more choices available, control transfers to Block 1955 to determine whether there are more subjects (e.g., more patterns) to be evaluated. If this test has a positive result, processing for another subject begins at Block 1960. If the test at Block 1955 has a negative result, on the other hand, then iteration of the logic of FIG. 19 ends by invoking Block 1985 to return a result of the execution. With regard to the detection operation, for example, this result comprises the set of all collections of participants for which the pattern is detected.

FIG. 26 provides sample code that may be used for implementing an "execute" method corresponding to the processing in FIG. 19. The functionality of this sample code will be well understood by those of ordinary skill in the art, and a detailed discussion of this sample code is therefore not deemed necessary to a complete understanding of the present invention.

FIG. 27 provides a grammar for the Prose pattern representation language disclosed herein. This grammar is expressed using "ANTLR" notation (where "ANTLR" is an acronym for "ANother Tool for Language Recognition"). The meaning of this notation and of the grammar expressed using this notation will be well understood by those of ordinary skill in the art, and further discussion thereof is therefore not deemed necessary to a complete understanding of the present invention. Furthermore, it will be understood that the grammar in FIG. 27 is provided by way of illustration and not of limitation of a syntax for the Prose pattern representation language, and alterations may be made to this grammar without deviating from the scope of the present invention.

As has been demonstrated, the disclosed pattern representation provides a pattern domain-specific language where a pattern codification is decoupled from code for execution of specific operational use cases against these patterns, occurrences, and models of interest. That is, the pattern codification does not specify operations such as applying the pattern or detecting this pattern. This is in contrast to known techniques, where (for example) a pattern may be represented with artifacts from a domain such as UML as marked-up exemplars. The disclosed techniques enable patterns to be reusable, in contrast (for example) to a known approach where imperative code for a particular pattern and operation are combined (and thus in this known approach, one body of code may be required for applying the singleton design pattern to a design model while a different body of code is required for detecting the singleton pattern in a design model). Other known approaches might be tuned directly to a single operation of interest, such as pattern detection or pattern application, without providing an operation-agnostic pattern representation format that works well with multiple operations.

An embodiment of the present invention does not limit a particular pattern representation to use with a single operation (such as pattern detection), and patterns can therefore be used with multiple operations such as applying patterns to new design models; detecting a pattern in multiple domain models; or reasoning about and comparing two patterns in order to pick the best solution for addressing a given problem. The techniques disclosed herein thus provide for pattern representation and use in a manner that is agnostic to (i.e., independent of) a particular operation and to the model or domain with which a pattern is used.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable or computer-readable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 28:
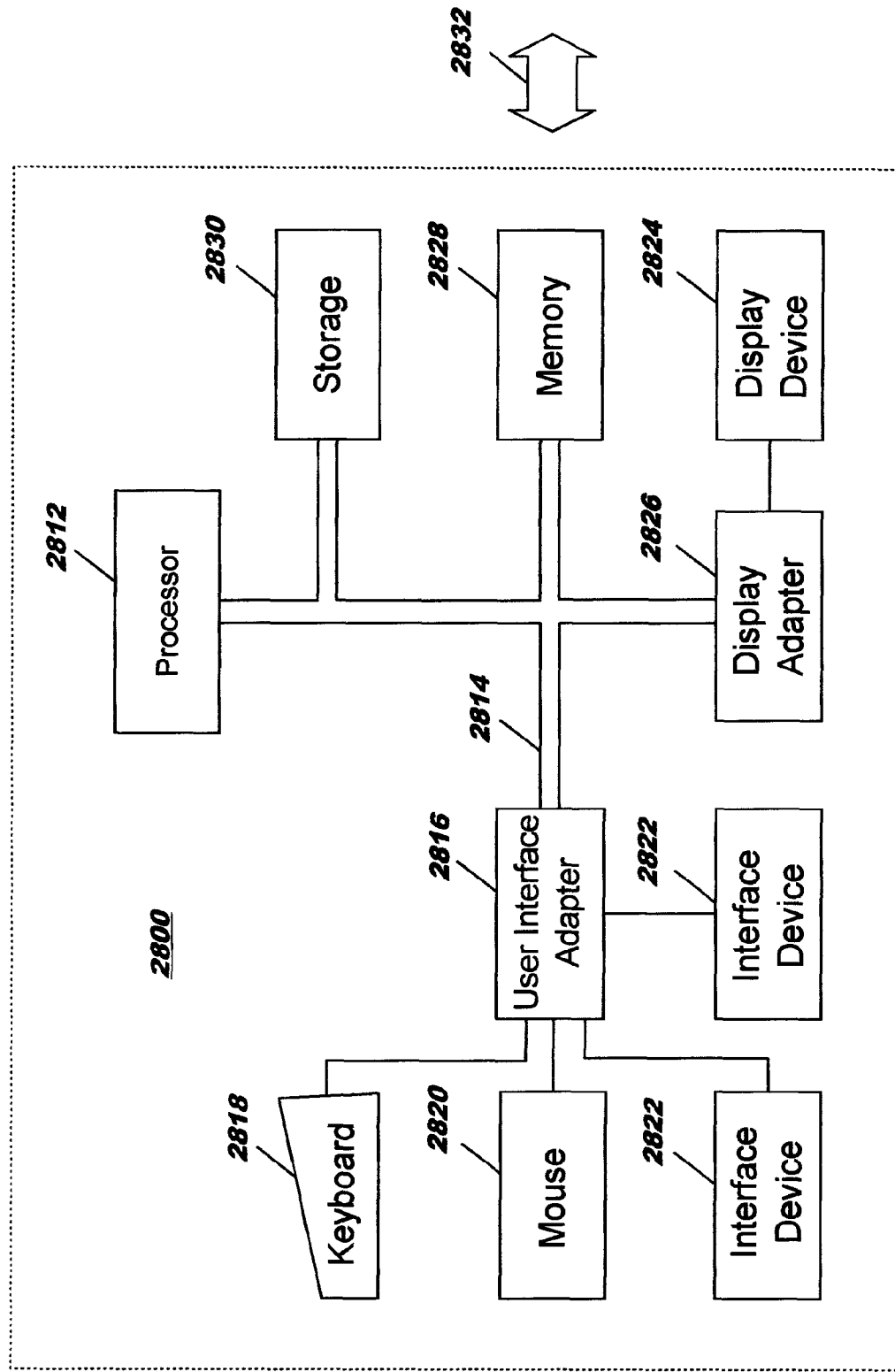
FIG. 28 depicts a data processing system suitable for storing and/or executing program code.

Referring now to FIG. 28, a data processing system 2800 suitable for storing and/or executing program code includes at least one processor 2812 coupled directly or indirectly to memory elements through a system bus 2814. The memory elements can include local memory 2828 employed during actual execution of the program code, bulk storage 2830, and cache memories (not shown) which provide temporary storage of at least some program code in order to reduce the number of times code must be retrieved from bulk storage during execution.

Input/output ("I/O") devices (including but not limited to keyboards 2818, displays 2824, pointing devices 2820, other interface devices 2822, etc.) can be coupled to the system either directly or through intervening I/O controllers or adapters (2816, 2826).

Network adapters may also be coupled to the system to enable the data processing system to become coupled to other data processing systems or remote printers or storage devices through intervening private or public networks (as shown generally at 2832). Modems, cable modem attachments, wireless adapters, and Ethernet cards are just a few of the currently-available types of network adapters.

Figure 29:
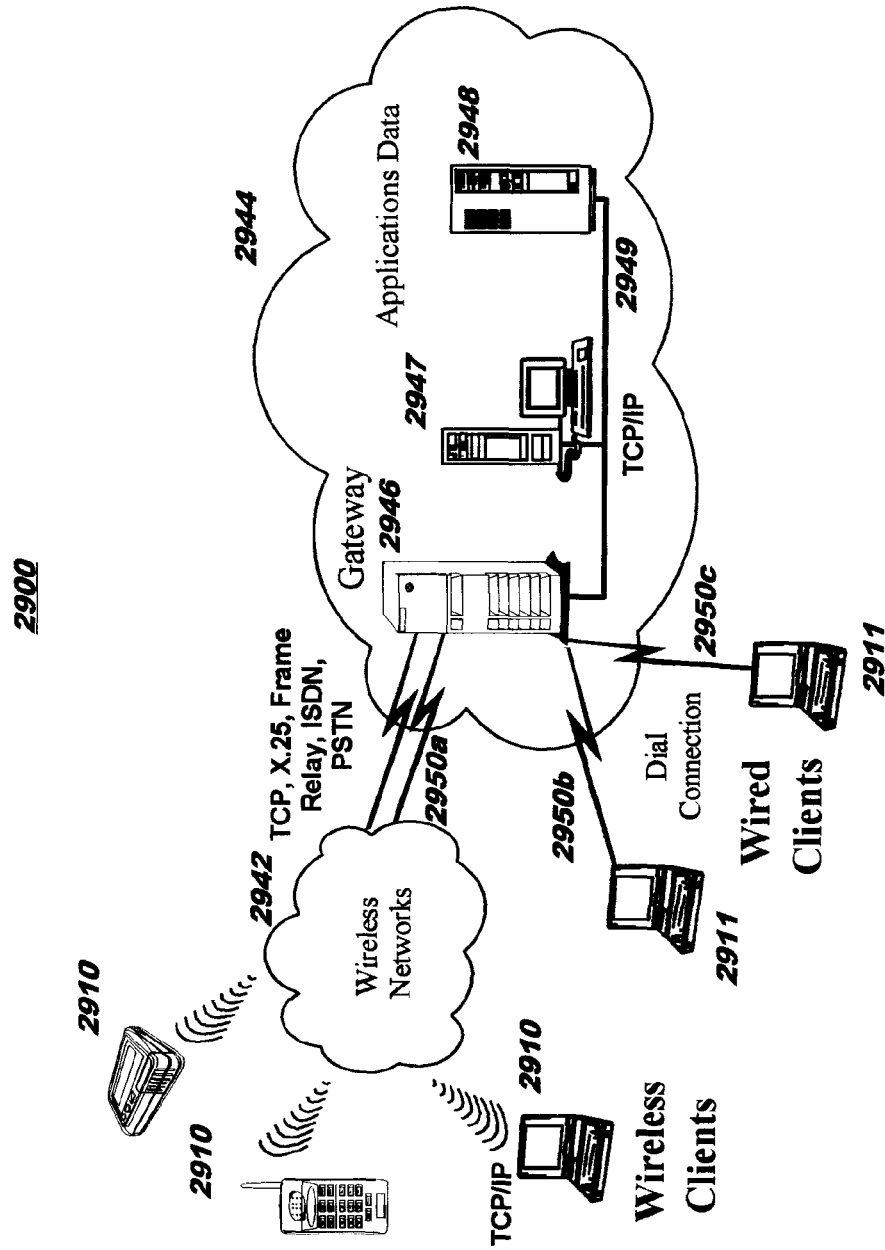
FIG. 29 depicts a representative networking environment in which one or more embodiments of the present invention may be used.

FIG. 29 illustrates a data processing network environment 2900 in which the present invention may be practiced. The data processing network 2900 may include a plurality of individual networks, such as wireless network 2942 and network 2944. A plurality of wireless devices 2910 may communicate over wireless network 2942, and a plurality of wired devices, shown in the figure (by way of illustration) as workstations 2911, may communicate over network 2944. Additionally, as those skilled in the art will appreciate, one or more local area networks ("LANs") may be included (not shown), where a LAN may comprise a plurality of devices coupled to a host processor.

Still referring to FIG. 29, the networks 2942 and 2944 may also include mainframe computers or servers, such as a gateway computer 2946 or application server 2947 (which may access a data repository 2948). A gateway computer 2946 serves as a point of entry into each network, such as network 2944. The gateway 2946 may be preferably coupled to another network 2942 by means of a communications link 2950a. The gateway 2946 may also be directly coupled to one or more workstations 2911 using a communications link 2950b, 2950c, and/or may be indirectly coupled to such devices. The gateway computer 2946 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks of IBM in the United States, other countries, or both, and "System i" is a trademark of IBM.)

The gateway computer 2946 may also be coupled 2949 to a storage device (such as data repository 2948).

Those skilled in the art will appreciate that the gateway computer 2946 may be located a great geographic distance from the network 2942, and similarly, the wireless devices 2910 and/or workstations 2911 may be located some distance from the networks 2942 and 2944, respectively. For example, the network 2942 may be located in California, while the gateway 2946 may be located in Texas, and one or more of the workstations 2911 may be located in Florida. The wireless devices 2910 may connect to the wireless network 2942 using a networking protocol such as the Transmission Control Protocol/Internet Protocol ("TCP/IP") over a number of alternative connection media, such as cellular phone, radio frequency networks, satellite networks, etc. The wireless network 2942 preferably connects to the gateway 2946 using a network connection 2950a such as TCP or User Datagram Protocol ("UDP") over IP, X.25, Frame Relay, Integrated Services Digital Network ("ISDN"), Public Switched Telephone Network ("PSTN"), etc. The workstations 2911 may connect directly to the gateway 2946 using dial connections 2950b or 2950c. Further, the wireless network 2942 and network 2944 may connect to one or more other networks (not shown), in an analogous manner to that depicted in FIG. 29.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention. Furthermore, while the discussion herein may refer to "an embodiment" or "one embodiment" of the present invention, such references are not necessarily discussing the same embodiment.

The invention claimed is:

1. A method of representing model-operative patterns, comprising:
    specifying a pattern codification for a particular pattern, the pattern codification comprising a structural definition portion and a behavioral definition portion, wherein:
        the pattern codification for the particular pattern is decoupled from executable code that carries out each operation for implementing the particular pattern;
        the structural definition portion defines each of at least one role used in the particular pattern and each of at least one relationship used in the particular pattern, wherein each of the at least one relationship involves at least one of the at least one role;
        when the particular pattern is composed from other composited patterns, the behavioral definition portion specifies each of at least one constraint that must be met before the particular pattern can be applied and identifies how to use ones of the at least one role of the particular pattern and the at least one relationship of the particular pattern for constraining expressions that are defined using at least one role and at least one relationship of the other composited patterns; and
        when the particular pattern is not composed from other composited patterns, the behavioral definition portion identifies the executable code that carries out each of at least one operation to invoke for implementing the particular pattern when the particular pattern is applied;
    comprehending the particular pattern in a particular model by identifying elements of the model that are candidate participants for each of the at least one pattern role of the particular pattern, for each of the at least one relationship involving the each role;
    executing a pattern operation using the comprehended pattern to determine whether each of the at least one constraint of the particular pattern is met; and
    responsive to determining that each of the at least one constraint is met, concluding that the identified elements of the model together comprise an occurrence of the particular pattern.

2. The method according to claim 1, further comprising storing the pattern codification for the particular pattern in a pattern library that stores pattern codifications for a plurality of patterns, enabling the stored pattern codification for the particular pattern to be composited by a different pattern.

3. The method according to claim 1, wherein the pattern codification further specifies a context applicable to the particular pattern.

4. The method according to claim 1, wherein:
    each of the at least one role and each of the at least one relationship in the particular pattern provides a point of variability for the particular pattern, the points of variability enabling reuse of the particular pattern; and
    the particular pattern is reusable by plugging in different domain elements as participants to fulfill at least one selected one of the at least one role of the particular pattern.

5. The method according to claim 1, wherein the at least one constraint comprises a specification of at least one relationship from at least one of the other composited patterns and for each of the at least one relationship, at least one role of the particular pattern which is involved in the at least one relationship from the at least one of the other composited patterns.

6. The method according to claim 1, wherein the structural definition portion defines a plurality of pattern roles and at least one relationship involving at least two of the plurality of pattern roles.

7. The method according to claim 6, wherein at least one of the plurality of pattern roles is optional and at least one other one of the plurality of pattern roles is mandatory.

8. The method according to claim 6, wherein at least one of the plurality of pattern roles has a cardinality greater than one.

9. The method according to claim 1, wherein:
    applying the pattern to a domain requires determining, for each of the at least one pattern role, a particular element of the domain that can fulfill the each role as a participant in the particular pattern for each of the at least one relationship involving the each role.

10. The method according to claim 1, wherein the particular pattern is not composed from other composited patterns when the particular pattern is an atomic pattern.

11. The method according to claim 10, wherein the operation to invoke when the particular pattern is an atomic pattern is implemented using an object-oriented programming language.

12. The method according to claim 10, wherein the operation to invoke when the particular pattern is an atomic pattern is implemented using an imperative programming language.

13. The method according to claim 1, wherein the pattern codification for the particular pattern is independent of a model from which model elements are evaluated for fulfilling each of the at least one roles, for each of the at least one relationship involving the each role, to determine whether the model exhibits the particular pattern.

14. The method according to claim 1, further comprising:
soring the pattern codification for the particular pattern in a pattern library that stores pattern codifications for a plurality of patterns; and
using the stored pattern codification for the particular pattern as a component for compositing a different pattern.

15. The method according to claim 1, wherein the comprehending further comprises recursively identifying elements of the model as candidate participants for each pattern role identified in the structural features of at least one other composited pattern from which the particular pattern is composed.

16. The method according to claim 1, further comprising determining, using the specified pattern codification for the particular pattern, whether the particular pattern can be applied to elements of a domain model.

17. The method according to claim 16, wherein the determining whether the particular pattern can be applied further comprises:
Determining, for each of the at least one role and each of the at least one relationship that involves the each role, ones of the elements which are candidate participants for fulfilling the role; and
iteratively selecting ones of the elements as candidate participants, plugging the selected ones in for fulfilling the roles, and evaluating the pattern with the plugged-in ones until determining that each of the at least one constraint is met when using the plugged-in ones for fulfilling the roles and thus concluding that the particular pattern can be applied or until determining that the particular pattern cannot be applied to the elements of the domain model.

18. A computer program product for building patterns as composites, the computer program product embodied on one or more non-transitory computer-readable storage media and comprising computer-readable program code for:
representing a particular model-operative pattern as a pattern codification specifying a structural definition portion defining structural features of the particular pattern and a behavioral definition portion defining behavioral features of the particular pattern, wherein:
the pattern codification for the particular pattern is decoupled from executable code that carries out each operation for implementing the particular pattern;
the structural definition portion defines each of at least one role used in the particular pattern and each of at least one relationship used in the particular pattern, wherein each of the at least one relationship involves at least one of the at least one role;
when the particular pattern is composed from other composited patterns, the behavioral definition portion specifies each of at least one constraint that must be met before the particular pattern can be applied and identifies how to use ones of the at least one role of the particular pattern and the at least one relationship of the particular pattern for constraining expressions that are defined using at least one role and at least one relationship of the other composited patterns; and
when the particular pattern is not composed from other composited patterns, the behavioral definition portion identifies the executable code that carries out each of at least one operation to invoke for implementing the particular pattern when the particular pattern is applied;
comprehending the particular pattern in a particular model by identifying elements of the model that are candidate participants for each of the at least one pattern role of the particular pattern, for each of the at least one relationship involving the each role;
executing a pattern operation using the comprehended pattern to determine whether each of the at least one constraint of the particular pattern is met;
responsive to determining that each of the at least one constraint is met, concluding that the identified elements of the model together comprise an occurrence of the particular pattern;
storing the specification for the particular model-operative pattern in a pattern library that stores pattern specifications for a plurality of model-operative patterns, thereby enabling the stored pattern specification to be composited by a different model-operative pattern; and
using the stored specification for the particular model-operative pattern as a component of a different pattern.

19. The computer program product according to claim 18, wherein the computer-readable program code for using the stored specification further comprises computer-readable program code for specifying, in the behavioral definition portion of the different pattern, at least one relationship defined in the structural definition portion of the particular model-operative pattern as a behavior of the different pattern.

20. A system for operational enablement of patterns, comprising:
a computer comprising a processor;
a tangible storage medium storing a plurality of patterns, each of the patterns represented as a pattern codification, each pattern codification comprising a structural definition portion and a behavioral definition portion, wherein, for each particular one of the patterns:
the pattern codification for the particular pattern is decoupled from executable code that carries out each operation for implementing the particular pattern;
the structural definition portion defines each of at least one role used in the particular pattern and each of at least one relationship used in the particular pattern, wherein each of the at least one relationship involves at least one of the at least one role;
when the particular pattern is composed from other composited patterns, the behavioral definition portion specifies each of at least one constraint that must be met before the particular pattern can be applied and identifies how to use ones of the at least one role of the particular pattern and the at least one relationship of the particular pattern for constraining expressions that are defined using at least one role and at least one relationship of the other composited patterns; and
when the particular pattern is not composed from other composited patterns, the behavioral definition portion identifies the executable code that carries out each of at least one operation to invoke for implementing the particular pattern when the particular pattern is applied; and an interpreter which is executable, by the processor of the computer, for comprehending a selected one of the plurality of patterns in a particular model by identifying elements of the model that are candidate participants for each of the at least one pattern roles of the selected pattern, for each of at least one relationship involving the each role in the selected pattern, executing a pattern operation using the comprehended pattern to determine whether each of the at least one constraint of the selected pattern is met, and responsive to determining that each of the at least one constraint is met, concluding that the identified elements of the model together comprise an occurrence of the selected pattern.

* * * * *